US012604215B2

(12) United States Patent
Mattam et al.

(10) Patent No.: US 12,604,215 B2
(45) Date of Patent: *Apr. 14, 2026

(54) METHOD AND SYSTEM FOR UE ACTIONS UPON SCG ACTIVATION AND DEACTIVATION

(71) Applicant: Samsung Electronics Co., Ltd., Suwon-si (KR)

(72) Inventors: Jajohn Mathew Mattam, Bangalore (IN); Vinay Kumar Shrivastava, Bangalore (IN); Fasil Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

This patent is subject to a terminal disclaimer.

(21) Appl. No.: 18/654,732

(22) Filed: May 3, 2024

(65) Prior Publication Data

US 2024/0292240 A1 Aug. 29, 2024

Related U.S. Application Data

(63) Continuation of application No. 17/506,238, filed on Oct. 20, 2021, now Pat. No. 11,985,519.

(30) Foreign Application Priority Data

Oct. 22, 2020 (IN) .............................. 202041046117
May 10, 2021 (IN) .............................. 202141021124
Oct. 4, 2021 (IN) ............................. 2021 41021124

(51) Int. Cl.
*H04W 24/02* (2009.01)
*H04B 7/06* (2006.01)
(Continued)

(52) U.S. Cl.
CPC ........ *H04W 24/02* (2013.01); *H04B 7/06964* (2023.05); *H04L 5/0048* (2013.01); (Continued)

(58) Field of Classification Search
CPC ... H04L 5/0023; H04L 5/0035; H04L 5/0048; H04W 24/02; H04W 72/30; (Continued)

(56) References Cited

U.S. PATENT DOCUMENTS

2020/0260520 A1 8/2020 Jin et al.
2020/0267631 A1 8/2020 Yilmaz et al.
(Continued)

FOREIGN PATENT DOCUMENTS

WO 2019/245335 A1 12/2019

OTHER PUBLICATIONS

Vivo; UE behaviour for a suspended SCG, 3GPP TSG-RAN WG2 Meeting #108; R2-1914944, Nov. 8, 2019, Reno, Nevada, USA.
(Continued)

*Primary Examiner* — Pao Sinkantarakorn
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method for enabling user equipment (UE) actions upon secondary cell group (SCG) deactivation is provided.

12 Claims, 8 Drawing Sheets

(51) Int. Cl.

| | |
|---|---|
| *H04L 5/00* | (2006.01) |
| *H04W 72/30* | (2023.01) |
| *H04W 76/19* | (2018.01) |
| *H04W 76/25* | (2018.01) |
| *H04W 76/28* | (2018.01) |
| *H04W 76/30* | (2018.01) |
| *H04W 74/0833* | (2024.01) |

(52) U.S. Cl.
CPC ........... *H04W 72/30* (2023.01); *H04W 76/19* (2018.02); *H04W 76/25* (2018.02); *H04W 76/28* (2018.02); *H04W 76/30* (2018.02); *H04W 74/0833* (2013.01)

(58) Field of Classification Search
CPC . H04W 74/0833; H04W 76/15; H04W 76/19; H04W 76/25; H04W 76/27; H04W 76/28; H04W 76/30
See application file for complete search history.

(56) References Cited

U.S. PATENT DOCUMENTS

| | | |
|---|---|---|
| 2021/0352750 A1 | 11/2021 | Cheng et al. |
| 2022/0007256 A1 | 1/2022 | Ozturk et al. |
| 2022/0070782 A1 | 3/2022 | Awoniyi-Oteri et al. |
| 2022/0141904 A1 | 5/2022 | Yilmaz et al. |
| 2022/0167445 A1 | 5/2022 | Wang et al. |
| 2022/0394583 A1 | 12/2022 | Deenoo et al. |
| 2022/0394620 A1 | 12/2022 | Hu et al. |
| 2023/0164871 A1 | 5/2023 | Jung et al. |
| 2023/0171838 A1* | 6/2023 | Zhang .................. H04W 24/10 370/329 |
| 2023/0189383 A1 | 6/2023 | Liu et al. |
| 2023/0199881 A1* | 6/2023 | Freda .................... H04L 5/0055 370/329 |
| 2023/0254866 A1* | 8/2023 | Wang .................... H04W 72/21 370/328 |
| 2023/0262540 A1 | 8/2023 | Kim et al. |
| 2023/0284145 A1* | 9/2023 | Da Silva ........... H04W 52/0235 370/311 |

OTHER PUBLICATIONS

Huawei; [AT113-e][230][eDCCA] Solution alternatives for SCG activation and deactivation (Huawei), 3GPP TSG-RAN WG2#113-e; R2-2101969, Feb. 5, 2021.

Extended European Search Report dated Aug. 9, 2024, issued in European Application No. 21883282.2-1215.

Ericsson, Efficient SCG/SCell (de)activation, R2-2007598, 3GPP TSG-RAN WG2 #111e, Electronic meeting, Aug. 6, 2020.

3GPP; TSG RAN; Evolved Universal Terrestrial Radio Access (E-UTRA) and NR; Multi-connectivity; Stage 2 (Release 16), 3GPP TS 37.340 V16.3.0, Oct. 2, 2020.

ZTE Corporation et al., Framework of SCG deactivation and activation, R2-2006900, 3GPP TSG RAN WG2 Meeting #111 electronic, e-meeting, Aug. 7, 2020.

3GPP; Technical Specification Group Radio Access Network; NR; Radio Resource Control (RRC) protocol specification (Release 16), 3GPP TS 38.331 V16.1.0, Jul. 2020.

International Search Report dated Jan. 20, 2022, issued in International Application No. PCT/KR2021/014805.

Indian Office Action dated Mar. 3, 2023, issued in Indian Application No. 202141021124.

Indian Office Action dated Jan. 8, 2026, issued in Indian Application No. 202141021124.

* cited by examiner

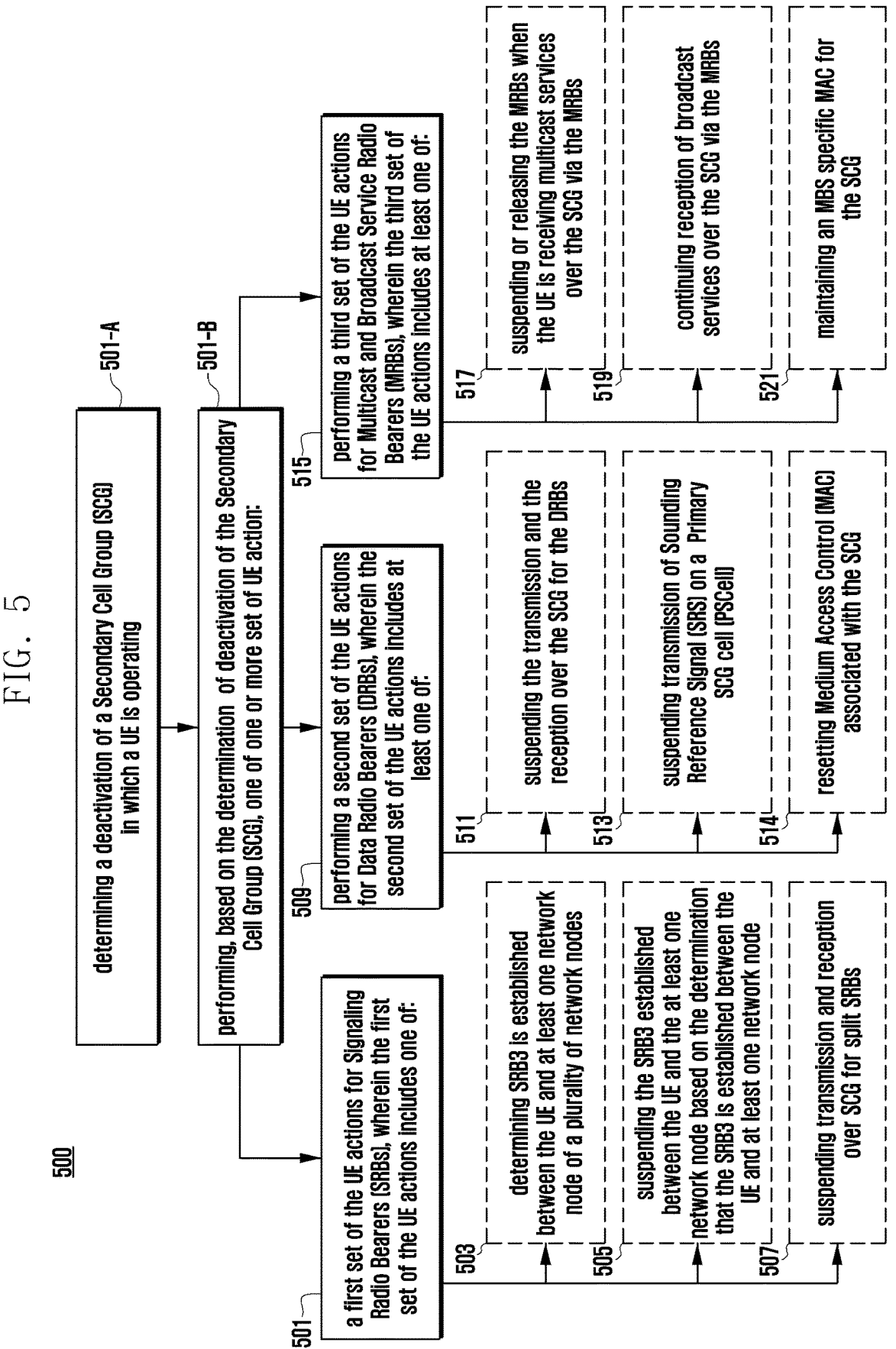

500

501-A
determining a deactivation of a Secondary Cell Group (SCG) in which a UE is operating 501-B
performing, based on the determination of deactivation of the Secondary Cell Group (SCG), one of one or more set of UE action:

501
a first set of the UE actions for Signaling Radio Bearers (SRBs), wherein the first set of the UE actions includes one of:

503
determining SRB3 is established between the UE and at least one network node of a plurality of network nodes 505
suspending the SRB3 established between the UE and the at least one network node based on the determination that the SRB3 is established between the UE and at least one network node 507
suspending transmission and reception over SCG for split SRBs 509
performing a second set of the UE actions for Data Radio Bearers (DRBs), wherein the second set of the UE actions includes at least one of:

511
suspending the transmission and the reception over the SCG for the DRBs 513
suspending transmission of Sounding Reference Signal (SRS) on a Primary SCG cell (PSCell)

514
resetting Medium Access Control (MAC) associated with the SCG 515
performing a third set of the UE actions for Multicast and Broadcast Service Radio Bearers (MRBs), wherein the third set of the UE actions includes at least one of:

517
suspending or releasing the MRBs when the UE is receiving multicast services over the SCG via the MRBs 519
continuing reception of broadcast services over the SCG via the MRBs 521
maintaining an MBS specific MAC for the SCG

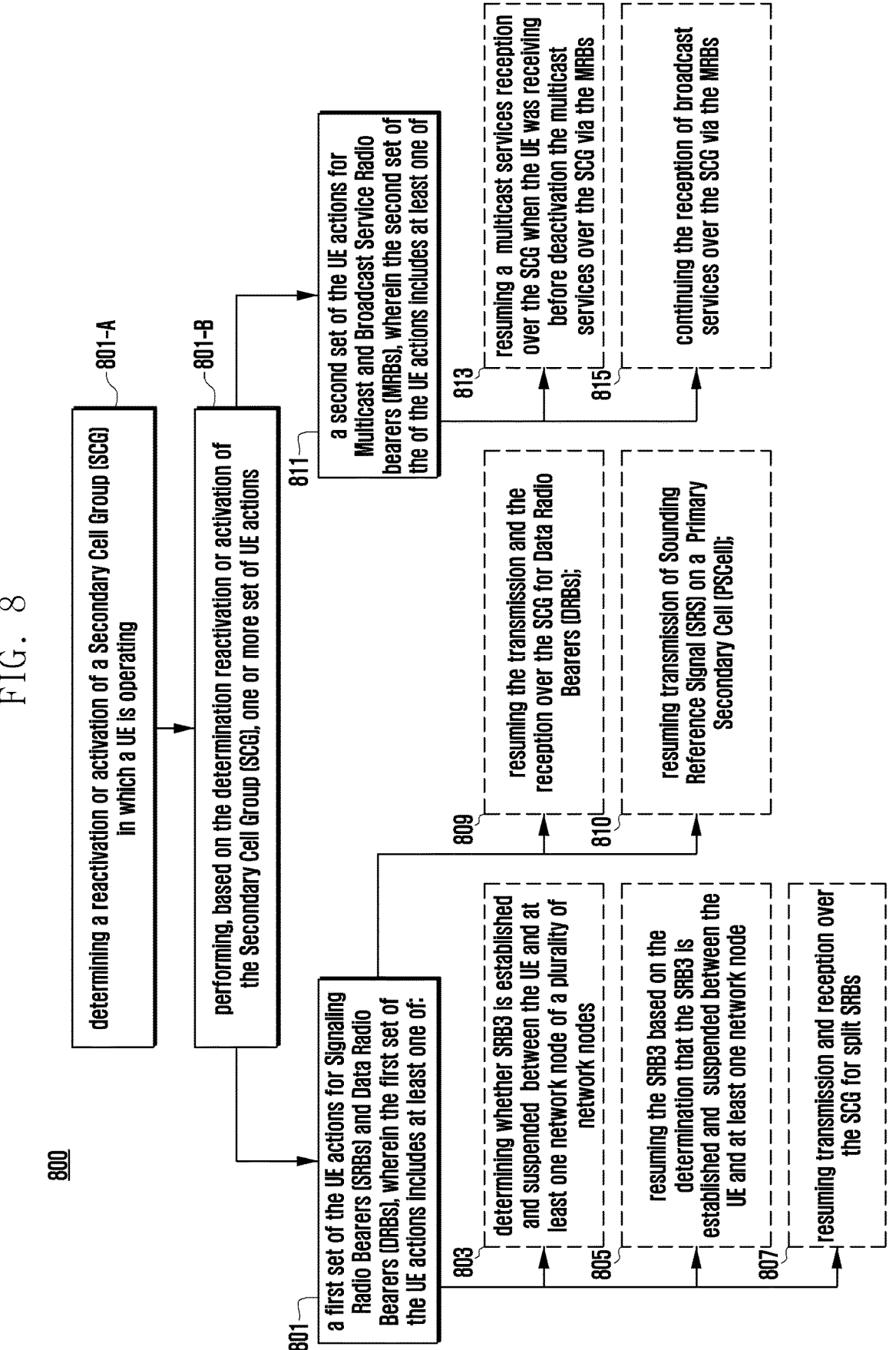

determining a reactivation or activation of a Secondary Cell Group (SCG) in which a UE is operating          801-A performing, based on the determination reactivation or activation of the Secondary Cell Group (SCG), one or more set of UE actions          801-B 801 — a first set of the UE actions for Signaling Radio Bearers (SRBs) and Data Radio Bearers (DRBs), wherein the first set of the UE actions includes at least one of:

803 — determining whether SRB3 is established and suspended between the UE and at least one network node of a plurality of network nodes 805 — resuming the SRB3 based on the determination that the SRB3 is established and suspended between the UE and at least one network node 807 — resuming transmission and reception over the SCG for split SRBs 809 — resuming the transmission and the reception over the SCG for Data Radio Bearers (DRBs);

810 — resuming transmission of Sounding Reference Signal (SRS) on a Primary Secondary Cell (PSCell);

811 — a second set of the UE actions for Multicast and Broadcast Service Radio bearers (MRBs), wherein the second set of the of the UE actions includes at least one of:

813 — resuming a multicast services reception over the SCG when the UE was receiving before deactivation the multicast services over the SCG via the MRBs 815 — continuing the reception of broadcast services over the SCG via the MRBs

METHOD AND SYSTEM FOR UE ACTIONS UPON SCG ACTIVATION AND DEACTIVATION

CROSS-REFERENCE TO RELATED APPLICATION(S)

This application is a continuation application of prior application Ser. No. 17/506,238 filed on Oct. 20, 2021, which issued as U.S. Pat. No. 11,985,519 on May 14, 2024; which is based on and claims priority under 35 U.S.C. § 119(a) of an Indian provisional patent application No. 202041046117 filed on Oct. 22, 2020 in the Indian Patent Office, of an Indian provisional patent application No. 202141021124 filed on May 10, 2021 in the Indian Patent Office, and of an Indian Complete patent application Ser. No. 202141021124 filed on Oct. 4, 2021 in the Indian Patent Office, the disclosure of each of which is incorporated by reference herein in its entirety.

BACKGROUND

1. Field

The disclosure relates to actions performed by a user equipment (UE). More particularly, the disclosure relates to at least one action to be performed by the UE on a secondary cell group (SCG) activation and deactivation.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, there exist use cases and applications that can benefit from a quick setup of dual connectivity on a UE. For this reason, it is reasonable that a network (NW) operator configures SCG to the UE (configured dual connectivity to a UE) as early in a connection as possible (e.g., as soon as connection is setup, or as soon as UE is in coverage of the SCG etc.). It is also possible that the UE no longer needs the dual connectivity for its ongoing services and may be better served without dual connectivity. One approach is that the UE can be released from dual connectivity and revert to single connectivity if the SCG is no longer required.

It is important to clearly specify UE behavior upon activation and deactivation of SCG.

In the current specification, packet data convergence protocol (PDCP) recovery is performed upon switching from a split bearer to a normal bearer i.e., upon release of one of the RLC entities associated with a PDCP of a split bearer. The network configures recovery of PDCP to UE when such an event occurs (e.g., when one RLC of a split bearer is released). During PDCP recovery, the associated RLC entity is always released (i.e., no RLC suspend). Thus, there is no UE autonomous trigger to perform recovery of PDCP in the prior art.

If Conditional PSCell Change (CPC) candidate(s) is configured, and if the condition to execute CPC is fulfilled while SCG is in deactivated/suspended state, there is no proper method to handle the case in the prior art.

When the SCG is in a deactivated/suspended state and if there is any master cell group (MCG) Failure detected, the UE will not be able to send MCGFailureInformation to the NW in the prior art.

As per the current specification (TS 38.331), if NR is configured as SCG in multi-radio dual connectivity (MR-DC) scenario i.e., (NG)EN-DC, NR-DC, and measurement report is triggered for configuration associated to the SCG, if an signaling radio bearer 3 (SRB3) is being configured on the UE, then the measurement report was sent over the SRB3. In an alternate scenario, if the SRB3 is not configured on the UE, then the measurement report was sent over an ULInformationTransferMRDC on the MCG i.e., over an SRB1 of the MCG.

When SCG deactivation is supported, this creates a new state for SRB3 wherein SRB3 is configured but SCG is deactivated. In such cases:

ALT1: Split SRB3

Any trigger measurement report for configuration associated with SCG, can be sent over the MCG leg of SRB3.

ALT2: Normal SRB3 i.e., not split SRB3

SRB3 is in a suspended state and therefore cannot be used to transmit measurement reports. This is the main issue when SRB3 is in the normal state.

If the SCG is deactivated, it is possible that a primary SCG cell (PSCell) goes very poor, if NW sends the reactivation for the SCG, this may result in some failure (RACH or synchronization failure). The UE will trigger RACH (Random Access Channel) procedure and RACH failure will be declared after T304 timer expiry. This will trigger SCG failure.

There is a need to define various procedures for various UE actions upon activation and deactivation of the SCG as mentioned above.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to introduce a selection of concepts, in a simplified format, that are further described in the detailed description of the disclosure. This summary is neither intended to identify key or essential inventive concepts of the disclosure and nor is it intended for determining the scope of the disclosure.

Additional aspects will be set forth in part in the description which follows and, in part, will be apparent from the description, or may be learned by practice of the presented embodiments.

In accordance with an aspect of the disclosure, the subject matter refers to a method for operating user equipment (UE) actions upon secondary cell group (SCG) deactivation is provided. The method includes determining a deactivation of a SCG in which a UE is operating. Thereafter, performing, based on the determination deactivation of the SCG, one of first set of UE actions, second set of UE actions or third set of UE actions. The first set of the UE actions are for signaling radio bearers (SRBs). The first set of the UE actions includes one of a) determining SRB3 is established between the UE and at least one network node of a plurality of network nodes, b) suspending the SRB3 established between the UE and the at least one network node based on the determination that the SRB3 is established between the UE and at least one network node, or c) suspending transmission and reception over SCG for split SRBs. The second set of the UE actions are for data radio bearers (DRBs). The second set of the UE actions includes one of a) suspending the transmission and the reception over the SCG for the DRBs, b) suspending the transmission of sounding reference signal (SRS) on a primary secondary cell (PSCell, or c) resetting medium access control (MAC) associated with the SCG. The third set of the UE actions are for multicast broadcast service radio bearers (MRBs). The third set of the UE actions includes a) suspending or releasing the MRBs when the UE is receiving multicast services over the SCG via the MRBs, b) continuing reception of broadcast services over the SCG via the MRBs, or c) maintaining a MBS specific MAC for the SCG.

In accordance with another aspect of the disclosure, the subject matter refers to a method for operating UE actions upon SCG activation (i.e., SCG activation after configuration of SCG) or re-activation (i.e., SCG activation after deactivation of SCG) is provided. In this disclosure, the terms of SCG activation and reactivation of SCG has been used interchangeably. The method includes performing, based on the determination reactivation of the SCG, one of a first set of UE action or a second set of UE action. The first set of the UE actions are for SRBs, wherein the first set of the UE actions includes at least one of a) determining whether SRB3 is established and suspended between the UE and at least one network node of a plurality of network nodes, b) resuming the SRB3 based on the determination that the SRB3 is established between the UE and at least one network node, c) resuming transmission and reception over the SCG for split SRBs, d) resuming the transmission and the reception over the SCG for DRBs, and e) resuming transmission of SRS on a PSCell. The second set of the UE actions are for MRBs. The second set of the UE actions includes at least one of a) resuming a multicast services reception over the SCG when the UE was receiving before deactivation the multicast services over the SCG via the MRBs and b) continuing the reception of broadcast services over the SCG via the MRBs.

Other aspects, advantages, and salient features of the disclosure will become apparent to those skilled in the art from the following detailed description, which, taken in conjunction with the annexed drawings discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a flow diagram for enabling UE actions upon SCG deactivation according to an embodiment of the disclosure;

FIG. 8 illustrates a flow diagram for enabling UE actions upon SCG activation or re-activation according to an embodiment of the disclosure.

Throughout the drawings, it should be noted that like reference numbers are used to depict the same or similar elements, features, and structures.

DETAILED DESCRIPTION

Figure 1:
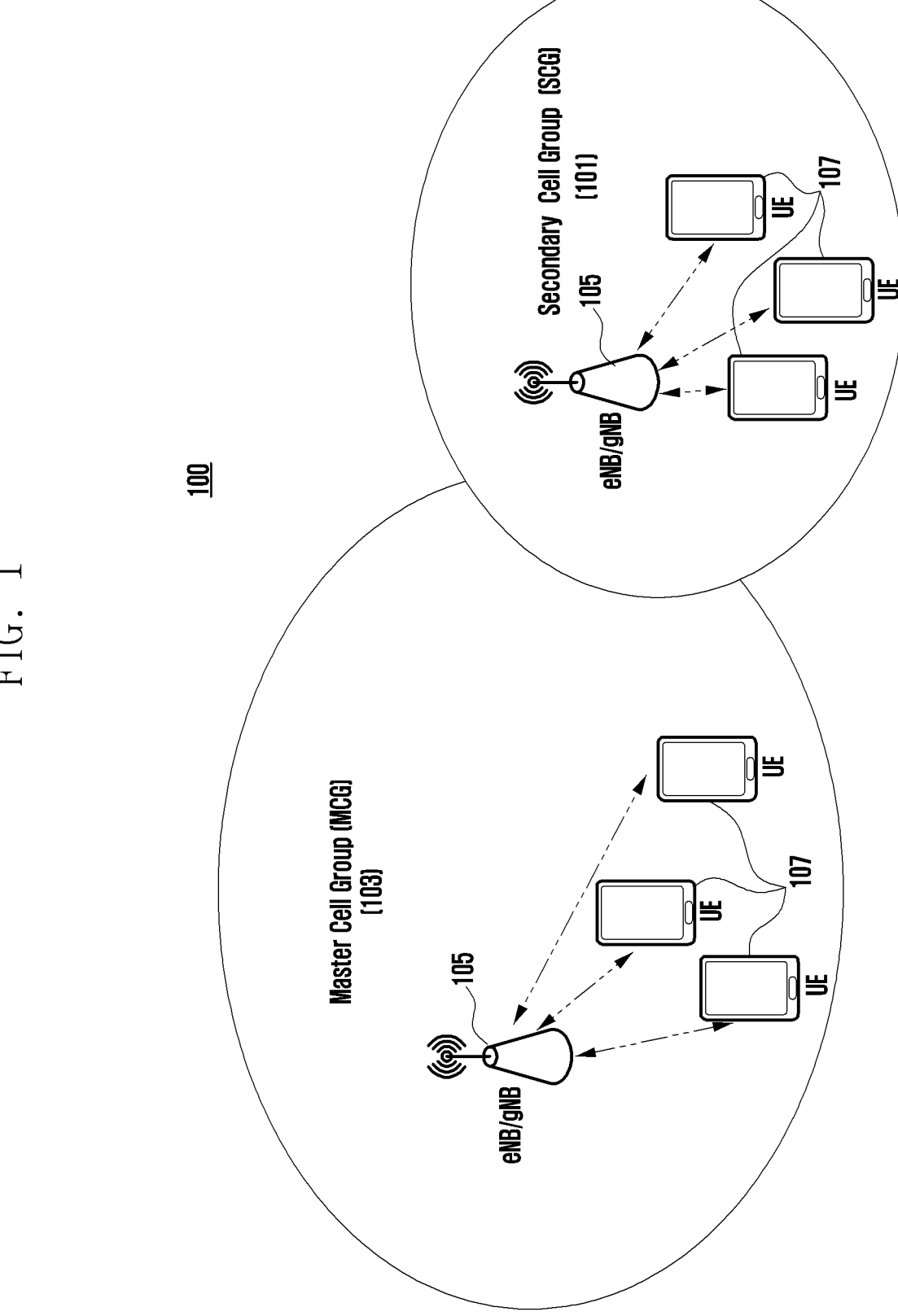
FIG. 1 illustrates a networking environment for dual connectivity (DC) between a master cell group (MCG) and a secondary cell group (SCG) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein, such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language, such as "there NEEDS to be one or more" or "one or more element is REQUIRED."

Unless otherwise defined, all terms, and especially any technical and/or scientific terms, used herein may be taken to have the same meaning as commonly understood by one having ordinary skill in the art.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting.

Embodiments of the disclosure will be described below with reference to the accompanying drawings.

FIG. 1 illustrates a networking environment 100 for dual connectivity (DC) between a master cell group (MCG) 103 and a secondary cell group (SCG) 101 according to an embodiment of the disclosure.

Referring to FIG. 1, as can be seen that one or more UEs 107 are connected to one or more network nodes (NN) 105 in general. That is to say one UE 107 may connect with one NN 105 as shown in the FIG. 1. The network node may be an eNB or gNB or any network node belonging to the next upcoming wireless standard generation. As an example, the one or more network node is connected to a core network (CN).

As an example, the network environment 100 may be a Long Term Evolution (LTE) system commonly referred as 4G or New Radio (NR) as in 5G as per the 3GPP or a future 6G wireless network. The network environment 100 may include radio access network (RAN), core network and so on.

Figure 2:
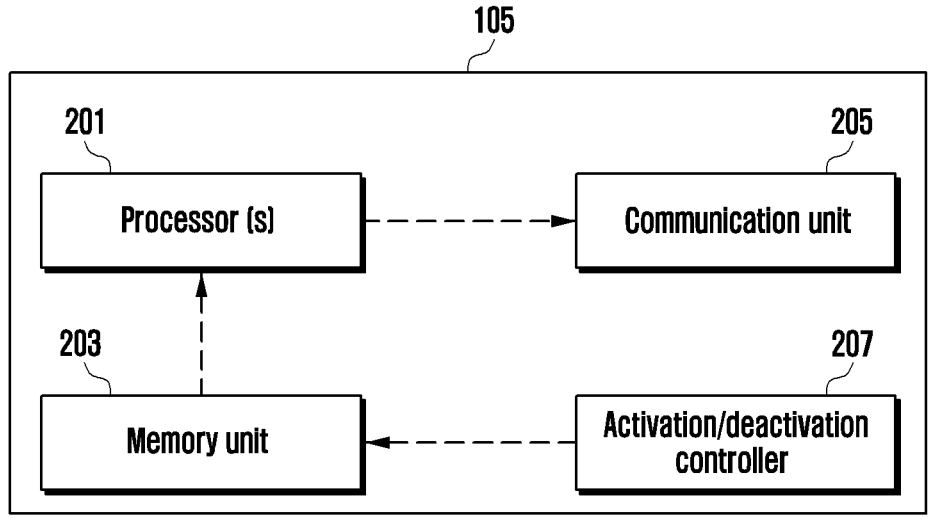
FIG. 2 illustrates a diagram of a network node according to an embodiment of the disclosure.

FIG. 2 illustrates a diagram of a network node according to an embodiment of the disclosure.

Referring to FIG. 2, the network node 105 may include at least one processor 201, a memory unit 203 (e.g., storage), a communication unit 205 (e.g., communicator or communication interface), and an activation/de-activation controller 207 Further, the network node 105 may also include the Cloud-RAN (C-RAN), a Central Unit (CU), a Core Network (CN), a Distributed unit (DU) or the any other possible network (NW) entity. The various examples of the network node are explained above therefore omitted here for the sake of brevity. The communication unit 205 may perform functions for transmitting and receiving signals via a wired or wireless channel.

In an example, the processor 201 and the activation/deactivation controller 207 may be a single processing unit or a number of units, all of which could include multiple computing units. The processor 201 and the activation/deactivation controller 207 may be implemented as one or more microprocessors, microcomputers, microcontrollers, digital signal processors, central processing units, state machines, logic circuitries, and/or any devices that manipulate signals based on operational instructions. Among other capabilities, the processor 201 and the activation/deactivation controller 207 may be configured to fetch and execute computer-readable instructions and data stored in the memory. The processor 201 and the activation/deactivation controller 207 may include one or a plurality of processors. At this time, one or a plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory unit 203 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 3:
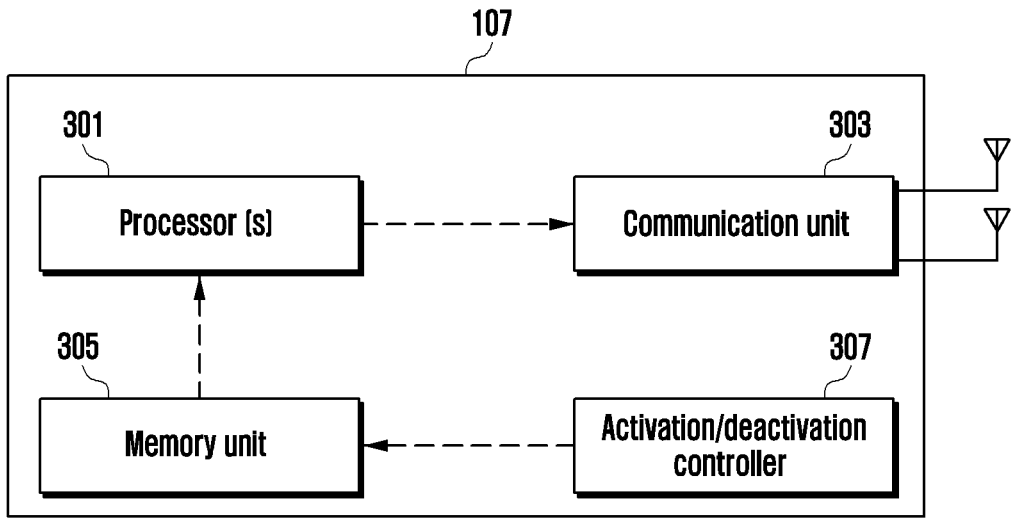
FIG. 3 illustrates a diagram of configuration of a user equipment (UE) in a wireless communication system according to an embodiment of the disclosure.

FIG. 3 illustrates a diagram of a configuration of a UE 107 in a wireless communication system according to an embodiment of the disclosure.

Referring to FIG. 3, the configuration may be understood as a part of the configuration of the UE 107. Hereinafter, it is understood that terms including "unit" or "module" at the end may refer to the unit for processing at least one function or operation and may be implemented in hardware, software, or a combination of hardware and software.

Referring to FIG. 3, the UE 107 may include at least one processor 301, a communication unit 303 (e.g., communicator or communication interface), a storage unit or a memory unit 305, and an activation/deactivation controller 307. By way of example, the UE 107 may be a cellular phone, IoT device, a vehicular device with communication facility, a television with connectivity, a laptop or other device that communicates over a plurality of cellular networks (such as a 3G, 4G, a 5G or 6G network or any future wireless communication network).

Further, the memory unit 305 and the activation/deactivation unit 307 have been explained above, therefore for the sake of brevity, the same has been omitted here. The communication unit 303 may perform functions for transmitting and receiving signals via a wireless channel.

Figure 4:
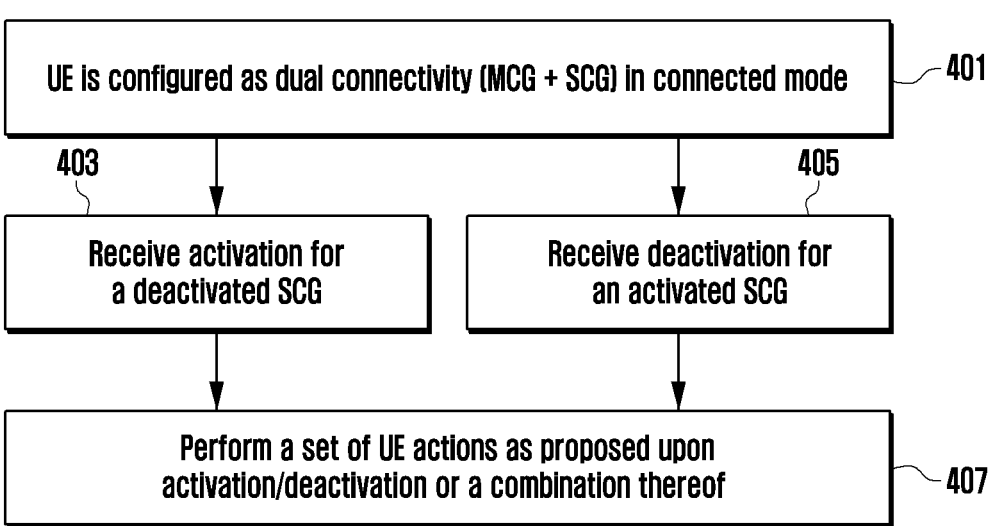
FIG. 4 illustrates a flow diagram for enabling UE actions upon SCG deactivation and re-activation according to an embodiment of the disclosure.

FIG. 4 illustrates a flow diagram for enabling UE actions upon SCG deactivation and activation (re-activation) according to an embodiment of the disclosure.

Referring to FIG. 4, a method 400 may be performed at the UE 107.

FIG. 4 will be explained with respect to the FIGS. 1 to 3. In an embodiment of the disclosure, the UE 107 may perform the following actions when configured as a dual connectivity (MCG+SCG) in connected mode.

At operation 401, initially the UE 107 is configured as the dual connectivity (MCG+SCG) in connected mode. Thereafter, the UE 107 may receive activation request for a deactivated SCG at operation 403 or the UE 107 may receive a deactivation request for an activated SCG at operation 405. Further, depending on the reception of either activation or deactivation the UE 107, performs a set of UE actions at operation 407 as proposed upon activation/deactivation or combination thereof. The set of UE actions performed by the UE 107 will be described in the forthcoming paragraphs.

FIG. 5 illustrates a flow diagram for enabling UE actions upon SCG deactivation according to an embodiment of the disclosure.

Referring to FIG. 5, it will be explained with respect to the FIGS. 1 to 4 where a method 500 may be performed at the UE 107. In an embodiment upon deactivation of the SCG, the UE 107 shall perform the following actions:

At operation 501-A: The method 500, includes determining a deactivation of a Secondary Cell Group (SCG) in which a UE is operating. Based on the determination of deactivation of the Secondary Cell Group (SCG), the UE performs one or more UE actions at operation 501-B.

At operation 501: The set of the UE actions are for Signaling Radio Bearers (SRBs). Alternately, the set of the UE actions for SRBs may be referred as a first set of UE action. According to an embodiment of the disclosure, the first set of UE action includes operations 503-507 may correspond to the operation 407 of FIG. 4. According to an embodiment of the disclosure, the first set of UE action includes operations 503-507 and may correspond to the operation 407 of FIG. 4. The second set of UE action includes operations 511-514 and may correspond to the operation 407 of FIG. 4. The third set of UE action includes operations 517-21 and may correspond to the operation 407 of FIG. 4.

Accordingly, at operation 503, determining if SRB3 is established between the UE 107 and at least one network node of a plurality of network nodes. If SRB3 is established.

At operation 505 the UE 107 suspends the SRB3 that was established between the UE 107 and the at least one network node 105 based on the determination that the SRB3 is established between the UE 107 and at least one network node 105.

At operation 507 the method 500 includes suspending transmission and reception over SCG for split SRBs. The operations 503-507 are associated with the first set of UE actions, where the UE 107 performs at least one step from the first set of UE action.

At operation 509, the method 500, further includes performing another set of the UE actions for Data Radio Bearers (DRBs). The another set of the UE actions includes one of:

At operation 511, the method 500 includes suspending the transmission and the reception over the SCG for the DRBs. Further, an uplink data processing may not be prohibited during SCG deactivation e.g., for acknowledged mode (AM) DRBs, even though the transmission is suspended during SCG deactivation. In an embodiment of the disclosure, at operation 513 UE 107 suspends transmission of sounding reference signal (SRS) on the PSCell. At operation 514, the UE 107 performs resetting of medium access control (MAC) associated with the SCG. In an alternative, the timing alignment (TA) timer is maintained after the SCG deactivation and SCG MAC is not reset.

Further, alternately, the set of the UE actions for DRBs may be referred as the second set of UE action. According to an embodiment of the disclosure, the operations 511-514 may correspond to the operation 407 of FIG. 4.

At operation 515, the method 500, further includes performing another set of the UE actions for Multicast and Broadcast Service Radio Bearers (MRBs). The another set of the UE actions includes one of:

At operation 517, the UE 107 suspending or releasing the MRBs when the UE is receiving multicast services over the SCG via the MRBs. The operation 517 may involve suspending or releasing of the at least one of associated MRB configurations for multicast services, flushing of the HARQ (Hybrid Automatic Repeat Request) buffers, resetting of timers etc. At operation 519, the UE 107 continue to perform reception of broadcast services over the SCG via the MRBs. At operation 521, the UE 107, maintains a MBS specific MAC for the SCG. This implies at least one of the associated MRB configurations for broadcast services, HARQ buffers, timers are maintained.

Further, alternately, the set of the UE actions for MRBs may be referred as the third set of UE action. According to an embodiment of the disclosure, the operations 517-521 may correspond to the operation 407 of FIG. 4.

In an embodiment of the disclosure, the UE 107, upon deactivation of SCG, shall follow actions as shown in the FIG. 5:

For SRBs:

Suspend SRB3, if established. In an alternative approach, SRB3 is not suspended, however, no transmission or reception is performed for SRB3.

Suspend transmission and reception over SCG for split SRBs.

For DRBs:

General Actions:

Suspend transmission and reception over SCG for DRBs. Further, uplink data processing may not be prohibited during SCG deactivation e.g., for acknowledged mode (AM) DRBs, even though transmission is suspended during SCG deactivation.

suspend transmission of SRS on the PSCell;

Reset SCG MAC. In an alternative approach, TA timer associated with SCG or PSCell continues running when the SCG is deactivated. In this case, SCG MAC is not reset.

For MRBs:

If UE is receiving MRBs for multicast services over SCG, suspend and/or release MRBs. The operation may involve suspending or releasing of the at least one of associated MRB configurations for multicast services, flushing of the HARQ buffers, resetting of timers etc.

If UE is receiving MRBs for broadcast services over SCG, continue reception on MRBs for broadcast services.

Maintain MBS specific MAC for SCG i.e., do not perform MBS specific reset for SCG MAC. This implies at least one of associated MRB configurations for broadcast services, HARQ buffers, timers are maintained.

According to an embodiment of the disclosure, an approach 1 includes:

Continuing to evaluate the configuration(s) associated with the SCG received in VarConditionalReconfig.

Continuing to evaluate the configuration(s) associated with SCG received in measConfig.

Suspending otherConfig associated with the SCG, if configured

Stopping timers T346a, T346b, T346c, T346d and T346e associated with the SCG, if running.

Suspending bap-Config associated with the SCG, if configured.

Suspending iab-IP-AddressConfigurationList associated with the SCG, if configured.

According to another embodiment of the disclosure, SRB3 and DRBs are not suspended, however, no uplink transmission or downlink reception is performed during the time the SCG remains deactivated. This implies UE can perform uplink data processing e.g., for AM DRBs.

According to an embodiment of the disclosure, an alternative of approach 1 is being disclosed here in approach 2. An approach 2 includes:

Releasing the configuration(s) associated with the SCG received in VarConditionalReconfig.

Releasing the configuration(s) associated with SCG received in measConfig.

Releasing otherConfig associated with the SCG, if configured.

Stopping timers T346a, T346b, T346c, T346d and T346e associated with the SCG, if running.

Release bap-Config associated with the SCG, if configured.

Release iab-IP-AddressConfigurationList associated with the SCG, if configured.

According to an embodiment of the disclosure, for the PDCP entity, the second set of the UE action includes changing, for a packet data convergence protocol (PDCP) layer for a PDCP entity, a primary uplink path to master cell group (MCG) for split DRBs. In particular, for split DRBs, the method 500 includes changing the primary uplink path to MCG entity (i.e., for bearers that are originally configured with a primary uplink path over SCG).

According to an embodiment of the disclosure, the second set of the UE actions further includes one of suspending the PDCP. In an embodiment of the disclosure, as an ALT1 includes: Suspending one or more PDCP entities associated with SCG when SCG is deactivated.

According to an embodiment of the disclosure, for suspending the PDCP, the second set of the UE action includes setting, for a transmitting entity, of state variables to an initial value and discarding, for the transmitting entity, each of previously stored PDCP protocol data units (PDUs). As an example, the state variable corresponds to TX_NEXT for PDCP entity as per the 3GPP specification.

In an example, for transmitting PDCP entity:

set TX_NEXT to the initial value; and discard all stored PDCP PDUs.

Now, based on a determination, for a receiving PDCP entity, that reordering timers are running, the method 500 further includes for receiving entity, stopping and resetting reordering timers for receiving entity, then delivering, for the receiving entity, each of previously stored PDCP service data units (SDUs) to upper layers in ascending order of associated count values after execution of a header decompression. Thereafter, setting, of state variables to an initial value. As an example, the reordering timers correspond to t-Reordering, state variable corresponds to RX_NEXT and RX_DELIV.

In an example, for receiving entity, if t-Reordering is running:

stop and reset t-Reordering;

deliver all stored PDCP SDUs to the upper layers in ascending order of associated COUNT values after performing header decompression; and set RX_NEXT and RX_DELIV to the initial value.

According to the further embodiment of the disclosure, for changing the primary uplink path to the MCG RLC entity, the second set of the UE actions further includes continuing and recovering the PDCP for the DRBs configured with a keyToUse set to secondary.

In an embodiment of the disclosure, an ALT2 includes: Do not suspend PDCP and not perform recovery of PDCP for DRBs which are configured with keyToUse set to secondary.

According to a further embodiment of the disclosure, for recovering the PDCP for the DRBs, the second set of the UE actions further includes sending a PDCP status report in uplink communication for Acknowledged Mode (AM) DRBs configured by upper layers and then retransmitting, for the AM DRBs, all PDCP Data PDUs that are previously submitted to suspended AM RLC entities in an ascending order of associated count values for which a successful delivery is not acknowledged by lower layers.

In an example, for AM DRBs configured by the upper layers to send a PDCP status report in the uplink, the receiving PDCP entity shall trigger a PDCP status report. Further, for AM DRBs, the transmitting PDCP entity shall perform retransmission of all the PDCP Data PDUs previously submitted to suspended AM RLC entity/entities in ascending order of the associated COUNT values for which the successful delivery has not been confirmed by lower layers. Further, embodiments will be explained with respect to the RLC entity and related UE actions upon deactivation of the SCG.

According to a further embodiment of the disclosure, the second set of the UE actions further includes suspending RLC entities for the DRBs configured on the SCG. In an example, the method 500 further includes suspending RLC entities for DRBs configured on SCG. For example, for RLC bearers associated with a radio bearer with keyToUse is set to secondary).

According to a further embodiment of the disclosure, for suspending the RLC entities for the DRBs configured on the SCG, the second set of the UE actions further includes one of resetting each of state variables associated with the RLC entity or storing current values of the state variables associated with the RLC entity.

In an implementation as an ALT1: Reset all state variables on RLC. In a further implementation as an ALT2: Store the current values of state variables upon deactivation, and restore and resume from the current values of state variables upon reactivation.

According to a further embodiment of the disclosure, the method 500 further includes stopping, upon SCG deactivation, for Radio Link Monitoring (RLM), a plurality of timers configured on the SCG based on a determination of a running state of the plurality of timers. As an example, the plurality of stop timers are at least one of T304, T310, T312 as defined in the 3GPP specification.

In an implementation, the RLM: Stop timers T310, T312 on SCG if running, stop timer T304 on SCG if running.

In an embodiment of the disclosure, upon SCG deactivation, the UE continues monitoring for the radio link monitoring (RLM) in at least one cell in the SCG utilizing existing configurations for RLM before the SCG deactivation. In another embodiment of the disclosure, upon SCG deactivation, UE continues monitoring for the RLM in at least one cell in the SCG utilizing new configurations for RLM. The new configurations for RLM is received along with SCG deactivation e.g., through RRC reconfiguration, RRCResume message carrying CellGroupConfig. As an alternative, gNB just indicates in CellGroupConfig to continue RLM with existing configuration before SCG deactivation and no new RLM configuration is provided, or not to perform RLM.

Further embodiments will be explained with respect to the MAC entity and related UE actions. In particular, the UE actions will be explained in case of a BeamFailureRecoveryConfig, a BeamFailureRecoverySCellConfig, and RadioLinkMonitoringConfig for the Beam Failure Detection and Recovery procedure are configured for SCG.

According to an embodiment of the disclosure, the method 500 further includes, performing a another set of the UE actions for medium access control (MAC) entities. Further, alternately, the another set of UE action for MAC entities may be referred as a fourth set of UE action. The another set of the UE actions includes one of:

continuing monitoring for detection of a beam failure in cells in the SCG; and triggering a beam failure recovery (BFR) process based on a detection of the beam failure associated with a secondary cell (SCell) or initiate a random access channel (RACH) process based on a detection of the beam failure associated with a primary secondary cell (PSCell); or suspending MAC configurations and stop the monitoring for the detection of the beam failure in cells in the SCG.

In an embodiment of the disclosure, it is indicated to the UE by the network entity whether to continue or stop monitoring of at least one of RLM and BFD upon SCG deactivation. This can be indicated along with the SCG deactivation message. When it is indicated and no new configurations are provided for the at least one of RLM and BFD, UE pursues after the SCG deactivation at least one of RLC and BFD with utilizing existing configurations for RLM and BFD, that is, configurations which were applicable as before SCG deactivation.

In an example as an ALT1: UE should continue monitoring for beam failure detection in at least one cells in SCG. Upon detection of the beam failure, trigger a BFR if it is SCell or initiates a RACH procedure if it is PSCell. In another example as an ALT2: UE should suspend these configurations and stop monitoring for the beam failure detection.

Further, alternately, the another set of the UE actions for medium access control (MAC) entities may be referred as fourth set of UE action. According to an embodiment of the disclosure, the another set of the UE actions for medium access control (MAC) entities may correspond to the operation 407 of FIG. 4.

In an embodiment of the disclosure, upon SCG deactivation, UE continues monitoring for the beam failure detection in at least one cell in the SCG utilizing existing configurations for BFD before the SCG deactivation. In another embodiment of the disclosure, upon SCG deactivation, UE performs monitoring for the beam failure detection in at least one cell in the SCG utilizing new configurations for BFD. The new configuration for BFD is received along with SCG deactivation e.g., through RRC reconfiguration, RRCResume message carrying CellGroupConfig. As an alternative, gNB just indicates in CellGroupConfig to continue BFD with existing configuration before SCG deactivation and no new BFD configuration is provided, or not to perform BFD.

According to another embodiment of the disclosure, when the UE continues to monitor for beam failure in cells of SCG and beam failure is detected, UE discontinues beam failure detection for SCG and reports the beam failure to the network through MCG.

According to an embodiment of the disclosure, performing another set of the UE actions for medium access control (MAC) entities include continue running a time alignment (TA) timer upon SCG deactivation. For example, TA timer is not stopped when SCG is deactivated and it continues with the value of the running timer.

According to a further embodiment of the disclosure, the method 500 further includes, performing another set of the UE actions for MAC entities upon SCG deactivation. The another set of the UE actions includes at least one of: continuing a TA timer, stopping the TA timer, stop reporting at least one of a buffer status report (BSR) and a power headroom report (PHR) over an SCG leg and suspending dynamic power sharing (DPS) related procedures, and UE cancels all pending triggers for at least one of a BSR and a PHR over an SCG leg or the UE suspends DPS related procedures.

Further, the another set of the UE actions for MAC entities upon deactivation of the SCG may corresponds to the operation 407 of FIG. 4. Further, alternately, the another set of UE action may referred as a tenth set of UE action.

In an embodiment of the disclosure, if timeAlignmentTimer is running and if SCG is deactivated, then as an ALT1:

Continue running timeAlignmentTimer. Further, as an ALT2: Stopping timeAlignmentTimer.

In an embodiment of the disclosure, UE performs at least one of the actions as:

Upon deactivation of SCG, UE stops reporting BSR and PHR over SCG leg.

Upon deactivation of SCG, UE cancels all pending triggers for BSR and a PHR over an SCG leg.

Upon deactivation of SCG, all dynamic power sharing (DPS) related parameters and procedures are suspended.

In another embodiment of the disclosure, the method 500 further includes, UE performs continuing, for mobility configurations, evaluation of conditional PSCell change (CPC) candidates configured. In an implementation, for Mobility: Continue evaluation of CPC candidates configured on the UE.

In a further implementation, for PDCP: the PDCP entity is maintained upon SCG deactivation.

Further, at the time of SCG deactivation, if the primary UL leg is MCG and no UL split, there is no change in the existing procedure. Further, if the primary UL leg is MCG and UL split or PDCP duplication is configured, UE should suspend the UL over secondary node (SN). Furthermore, if the primary UL leg is SCG and no UL split, UE may autonomously switch the UL leg to MCG if not explicitly changed by NW and suspend the UL over SCG. Furthermore, if the primary UL leg is SCG and UL split or PDCP duplication is configured, UE may autonomously switch the primary UL leg to MCG if not explicitly changed by NW and suspend the UL over SN.

According to an embodiment of the disclosure, the method 500, further includes, performing, upon SCG deactivation, another set of UE actions for at least one of radio resource management (RRM) measurement and channel-state information (CSI) measurement, wherein the another set of UE action includes one of:

continuing to perform the at least one of RRM measurement and CSI measurement, with the existing RRC and/or CSI configurations, on and/or for at least one of the cells in SCG.

continuing to perform the at least one of RRM measurement and CSI measurement, with the new received RRC and/or CSI configurations at SCG deactivation, on at least one of the cells in SCG. The new configurations are received in RRC reconfiguration message at the SCG deactivation.

suspending at least one of RRM configuration and CSI configuration and stop performing the at least one of RRM measurement and CSI measurement on for at least one of the cells in SCG.

releasing the at least one of RRM configuration and CSI configuration and stop performing the at least one of RRM measurement and CSI measurement on at least one of the cells in SCG.

Further, the another set of the UE actions for at least one of RRM measurement and CSI) measurement may correspond to the operation 407 of FIG. 4. Further, alternately, the another set of UE action for RRM measurement and CSI measurement may referred as an eleventh set of UE action.

According to yet a further embodiment of the disclosure, the method 500 further includes performing, for at least one of RRM configurations and CSI configurations, at least one of the RRM measurements and the CSI measurements for the SCG cells such that a frequency of at least one of the RRM measurements and the CSI measurements is reduced. The at least one of the RRM configurations and CSI configurations are received at least one node from the plurality of network nodes when SCG is deactivated, and the RRM configurations and CSI configurations are based on at least one of signal conditions and UE mobility information. Accordingly, the UE performs RRM measurement and/or CSI measurement for SCG cells in a lenient or relaxed manner.

In an embodiment of the disclosure, UE is allowed to report CSI report on and/or for the at least one SCG cells upon SCG deactivation as per configuration by the network. This configuration is provided by the network e.g., using RRC signalling at the time of SCG deactivation.

In an embodiment of the disclosure, UE performs RRM measurement and/or CSI measurement for SCG cells upon SCG (re-)activation in a normal manner from an earlier lenient or relaxed manner when SCG was in deactivated state. The normal configuration for the measurement is the same as which was used earlier to deactivate and/or newly configured by the network.

In an embodiment of the disclosure, the UE relinquishes the DRX configuration for the SCG, when SCG is deactivated.

In another embodiment of the disclosure, the UE maintains the DRX configuration for the SCG, when SCG is deactivated, however, UE does not apply the DRX operation for SCG.

In another embodiment of the disclosure, when SCG is deactivated, the UE performs CSI measurement and/or reports the CSI report during the time period corresponding to On-duration timer of DRX configuration. Alternately, the On-duration timer may not be started.

In an embodiment of the disclosure, the UE 107 performs RRM measurement and/or CSI measurement for at least one of the SCG cells upon SCG activation or reactivation as follows:

In an implementation as an ALT1: UE 107 may continue performing for RRM measurement and/or CSI measurement for at least one of the cells in SCG.

In an implementation as an ALT2: UE 107 may resume the configurations for RRM and/or CSI, which were suspended at deactivation of SCG, and start/restart performing for RRM measurement and/or CSI measurement for at least one of the cells in SCG.

In an implementation as an ALT3: UE 107 may receive new configurations from the network and accordingly, start performing for RRM measurement and/or CSI measurement for at least one of the cells in SCG.

Upon reactivation, the UE 107 reverts the primary uplink path based on the original configuration from the network. Currently, PDCP recovery happens only when there is a handover or re-establishment. To help in data recovery due to SCG deactivation, the receiving PDCP entity may trigger a PDCP status report when the SCG is deactivated. Upon deactivation of SCG, the UE 107 may recover PDCP for DRBs which are configured with keyToUse set to secondary. For AM, the DRBs are configured by upper layers to send a PDCP status report in the uplink, the receiving PDCP entity may trigger a PDCP status report. For AM, DRBs, the transmitting PDCP entity may perform retransmission of all the PDCP Data PDUs previously submitted to suspended AM RLC entity/entities in ascending order of the associated COUNT values for which the successful delivery has not been confirmed by lower layers.

Upon SCG deactivation associated RLC is released or suspended.

In an example as an ALT1: Network signals deactivation of SCG to the UE. Now, while signaling about SCG deactivate, the network also configures all SCG PDCP with recoverPDCP. The UE performs actions upon PDCP recovery i.e., PDCP status reporting by PDCP Rx entity and PDCP reordering/retransmission by PDCP Tx entity. For AM, the DRBs configured by upper layers to send a PDCP status report in the uplink, the receiving PDCP entity shall trigger a PDCP status report. Further, for AM, the DRBs, the transmitting PDCP entity shall perform retransmission of all the PDCP Data PDUs previously submitted to suspended AM RLC entity in ascending order of the associated COUNT values for which the successful delivery has not been confirmed by lower layers.

In an example as an ALT2: the UE autonomously triggers the deactivation of SCG. In an example as an ALT2A: For Network assisted recovery: Network pre-configures (during bearer setup or modify) the SCG PDCP with PDCP recovery upon SCG deactivation. For example, the IE SCGDeactiveRecoverPDCP to allow trigger of PDCP entity upon deactivation of SCG).

In an example as an ALT2: the UE autonomous trigger: Upon deactivation of SCG, the UE autonomously triggers PDCP recovery for the required bearers.

Further, upon receiving an indication of RLC suspension from upper layers, the UE 107 performs the following actions:

Transmit RLC entity. This includes:
Buffered data: discard all RLC SDUs, RLC SDU segments, and RLC PDUs, if any;
Timers: stop and reset all timers; and
State Variables.

In an example as an ALT1: the UE 107 resets all state variables to their initial value, e.g., set TX_Next to initial value. In an example as an ALT2: the UE 107 stores the state variables in order to continue them upon re-activation of SCG. b) Receive RLC entity. This includes:
Timers: Stop and reset all timers e.g., stop and reset reassembly timer, if running.
Stored Data: Deliver to upper layers, RLC SDUs in ascending order of SN values.

In an example as an ALT1: the UE 107 resets all state variables to their initial value, e.g., set RX_Next to initial value.

In an example as an ALT2: the UE 107 stores the state variables in order to continue them upon re-activation of SCG.

38.322 specification Illustration (example) in Table 1 below:

TABLE 1

5.x.x RLC entity suspend
When upper layers request an RLC entity suspend, the transmitting RLC entity shall:
- discard all RLC SDUs, RLC SDU segments, and RLC PDUs, if any;
- stop and reset all timers; and
- reset all state variables to their initial values.
When upper layers request an RLC entity suspend, the receiving RLC entity shall:
- if t-Reassembly is running:
- stop and reset t-Reassembly;
- deliver all stored RLC SDUs to the upper layers in ascending order of associated SN values;
- stop and reset all timers; and
    - reset all state variables to their initial values.

According to the further embodiment of the disclosure, the method 500, further includes determining the CPC is configured and associated conditions for a configuration are satisfied during the deactivation of the SCG. Based on the determination that the CPC is configured and associated conditions for the configuration are satisfied, resume the suspended SRB3, apply the configuration of the target cell and initiate a random access channel (RACH) process to send complete RRC reconfiguration required upon execution of the CPC. Further, after successful completion of the RACH process, UE reverts back to SCG suspended or deactivated state. In an alternative, UE reactivates the SCG and monitors the SCG for future deactivation, based on the configurations received from a plurality of the network node. In another alternative, SCG state (activated or deactivated) is based on signaling from CPC target node.

In an implementation, if CPC is configured, and if associated conditions for a configuration is satisfied while SCG is in deactivated/suspended state, The UE 107 performs the following actions:
Resuming the suspended SRB3.
UE may apply the configuration of the target cell.
Initiate the RACH procedure to send RRC reconfiguration complete required upon CPC execution.
After the successful completion of RACH procedure, UE may either
Revert to the SCG suspended state, as the trigger to reactivate SCG was for mobility; Or
reactivate SCG and monitor for data inactivity (for future deactivation of SCG).

In a further implementation as an Alternative 3 (ALT3) the SCG state (activated/deactivated) is based on signaling from the CPC target node.

Figure 6:
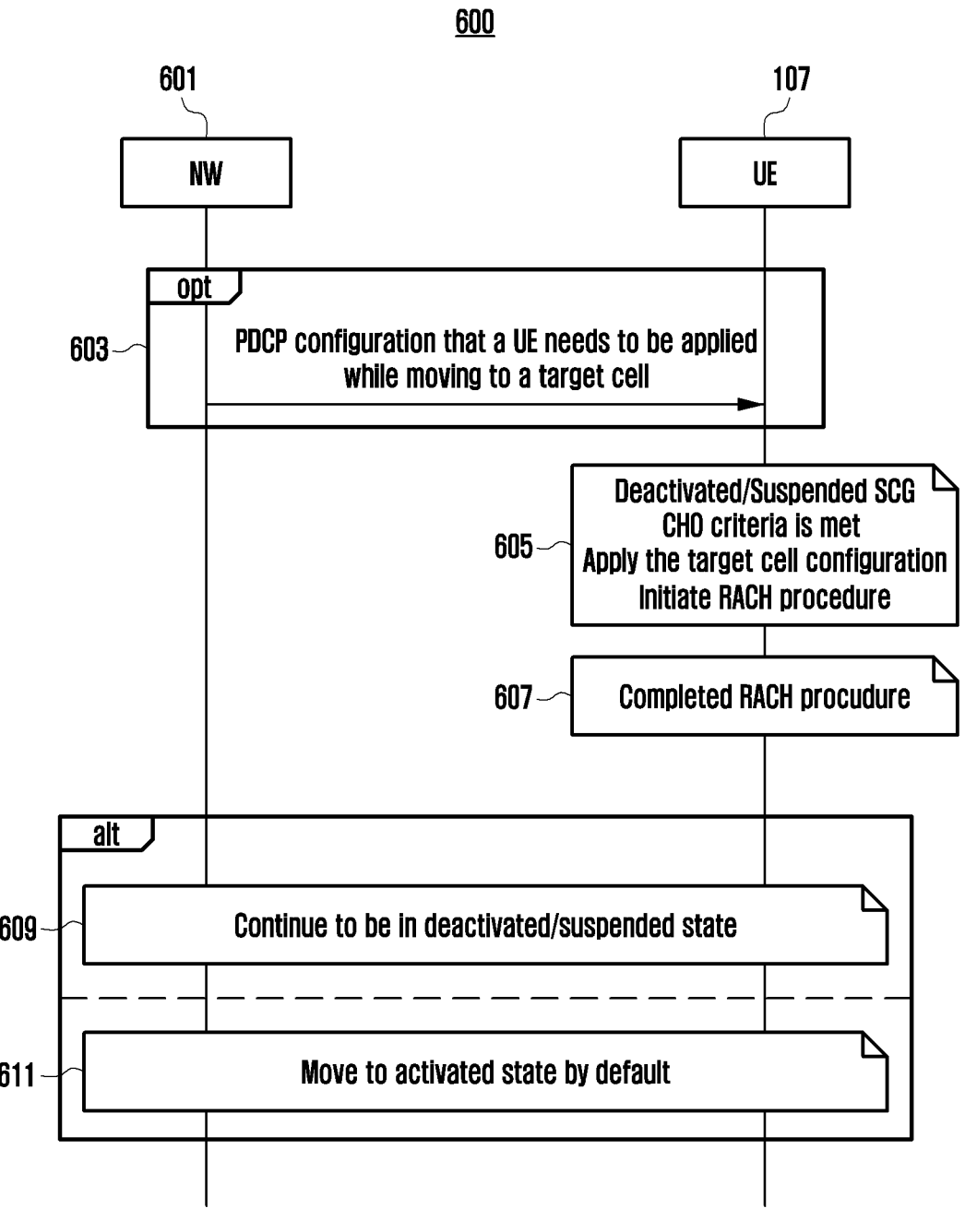
FIG. 6 illustrates an operational flow diagram depicting a method for configuring CHO for PSCell according to an embodiment of the disclosure.

FIG. 6 illustrates an operational flow diagram 600 depicting a method for configuring CHO for PSCell according to an embodiment of the disclosure. Accordingly, the UE 107 may perform the following operations:

Referring to FIG. 6, at operation 603, the network 301 may initiate PDCP configuration that the UE 107, that needs to be applied while moving to a target cell. Thereafter, at operation 605, at the UE 107, the UE 107 has deactivated/ suspended SCG when the CHO criteria are met. Thereafter, UE 107 applies the target cell configuration. Then, the UE 107 initiates RACH procedure. Further, at operation 607, the UE 107 completes the RACH procedure. Further at operation 609, as an alternative 1, UE continues to be in the SCG deactivated or suspended state. Further at operation 611, as an alternative 2, UE 107 moves to an SCG activated state by default.

Figure 7:
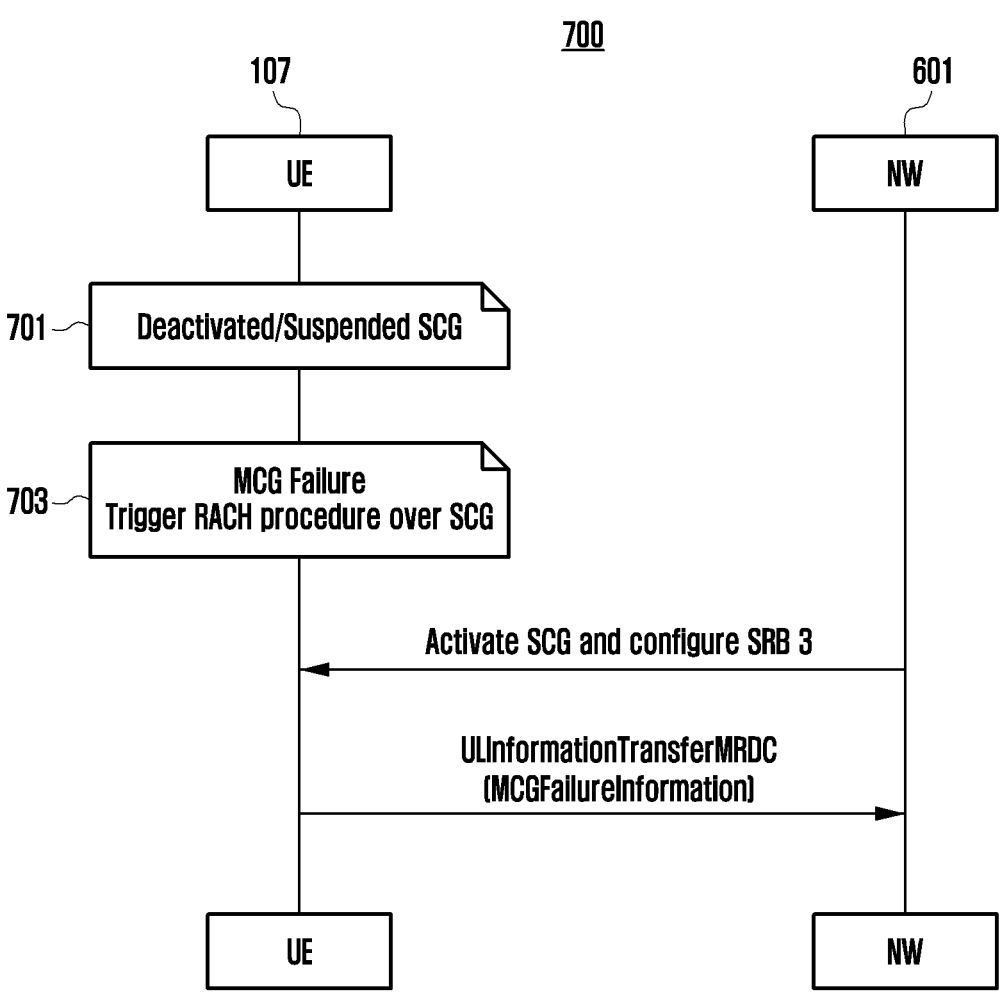
FIG. 7 illustrates an operational flow diagram, when an MCG failure is detected according to an embodiment of the disclosure.

FIG. 7 illustrates an operational flow diagram 700, when an MCG failure is detected according to an embodiment of the disclosure.

Referring to FIG. 7, the method 700 includes detecting Master Cell Group (MCG) failure during the time when SCG is in deactivated state. Thereafter, performing, to report the detected MCG failure, another set of the UE actions based on the detection of the MCG failure. Accordingly, the another set of the UE actions includes one of:
Triggering a Random Access Channel (RACH) process based on a previously stored configuration of the SCG;
Activating each of the SCG and the suspended SRB3 after completion of the RACH process;
Transmitting MCGFailureInformation associated with the detected MCG failure to the plurality of network nodes after the activation or reactivation; or
Triggering of a re-establishment process associated with a failure of the re-activation of the SCG.

Further, alternately, the set of the UE actions based on the detection of the MCG failure may be referred as a fifth set of UE action. According to an embodiment of the disclosure, the set of UE actions based on the detection of the MCG failure may correspond to the operation 407 of FIG. 4.

Referring to FIG. 7, as an option 1, at operations 701 and 703, if the MCG Failure is detected while SCG is in the deactivated/suspended state, the UE should trigger the RACH procedure with a previously stored configuration of the SCG. Accordingly, NW 601 may provide the RACH configuration which needs to be applied along with the deactivation command or UE 107 may use the same RACH configuration shared by NW 601 while configuring/adding SCG.

Further, after the successful completion of RACH, the NW 601 may activate the SCG and SRB3. Thus, the UE 107 may perform the following action:

The UE may send failure information as an MCGFailureInformation after activating SCG over SRB3 or split SRB1.

The UE 107 may include and set measResultSCG or measResultSCG-EUTRA wherever applicable.

If the UE 107 may not able to activate SCG properly due to any failure, it may trigger the re-establishment procedure.

According to the another embodiment as an option 2: If MCG Failure is detected while SCG is in the deactivated/suspended state, the UE as the another set of UE action may directly trigger the re-establishment procedure. For example, if the MCG failure is not declared/MCGFailureInformation procedure is not initiated, but RLF is declared and the re-establishment procedure is initiated.

As a further embodiment of the disclosure, in the method 500, the fifth set of UE action may include at least one of:

The UE 107 performs submitting, as a message embedded in NR Radio Resource Control (RRC) message via the SRB3, the MCGFailureInformation to lower layers for transmission when the SRB3 is configured and the SCG is in activated state.

The UE 107 performs activating SCG, when the SRB3 is configured and the SCG is deactivated, the SCG for the submission of the MCGFailureInformation to the lower layers.

The UE 107 performs submitting MCGFailureInformation to lower layers for transmission via SRB1, when SRB1 is configured as split SRB. Upon submission of message, the procedure ends.

The Table 3 and Table 4 illustrate a methodology associated with the another set of UE action when the MCG failure is being detected.

TABLE 2

| |
| --- |
| 5.7.x MCG failure information |
| 5.7.x.y Initiation |
| A UE configured with split SRB1 or SRB3 initiates the procedure to report MCG failures when neither MCG nor SCG transmission is suspended for a cause other than SCG deactivation, t316 is configured, and when the following condition is met: |
|     1> upon detecting radio link failure of |
|         the MCG, in accordance with 5.3.10.3, while |
|         T316 is not running. |
| 5.3.10.3 Detection of radio link failure |
| 5> if SCG transmission is not suspended; and |
| 5> if PSCell change is not ongoing (i.e., timer T304 for the NR PSCell is not running in case of NRDC or timer T307 of the E-UTRA PSCell is not running as specified in TS 36.331 [10], clause 5.3.10.10, in NE-DC): |
|     - 6> initiate the MCG failure information procedure as specified in 5.7.3b to report MCG radio link failure. |
| 5> else if SCG transmission is suspended due to SCG deactivation; and |
|     - 6> initiate the MCG failure information procedure as specified in 5.7.3b to report MCG radio link failure. |
| 5> else: |
|     - 6> initiate the connection re-establishment procedure as specified in 5.3.7. |

TABLE 3

| |
| --- |
| ALT 1 |
| The UE shall: |
|     1> start timer T316; |
|     if SRB1 is configured as split SRB: |
|     submit the MCGFailureInformation message to lower layers for transmission via SRB1, upon which the procedure ends; |
|     else (i.e., SRB3 configured and is not deactivated): |
|     2> submit the MCGFailureInformation message to lower layers for transmission embedded in NR RRC message |
| ULInformationTransferMRDC via SRB3 as specified in 5.7.2a.3. |

TABLE 4

| |
| --- |
| ALT 2 |
| The UE shall: |
|     2> 1>start timer T316; |
|     1>if SRB1 is configured as split SRB: |
|     2>Submit the MCGFailureInformation message to lower layers for transmission via SRB1, upon which the procedure ends; |
|     1>else (i.e., SRB3 configured): |
|     2>if (SCG is deactivated): |
|         3>Activate SCG |
|     2> submit the MCGFailureInformation message to lower layers for transmission embedded in NR RRC message |
| ULInformationTransferMRDCvia SRB3 as specified in 5.7.2a.3. |

According to yet further embodiment of the disclosure, if the NR is configured as SCG in MR-DC scenario i.e., (NG)EN-DC, NR-DC, and measurement report is triggered for configuration associated to SCG, new handling has to be added. For doing so the method 500 further includes performing a sixth set of the UE actions for transfer of the MeasurementReport message from the UE 107 to the plurality of network nodes. The sixth set of the UE actions for the transfer of the measurement results includes one of:

submitting the MeasurementReport message to lower layers of the plurality of network nodes via the SRB3 when the UE is in one of EUTRA-NR Dual Connectivity (EN-DC) mode or (NG)EN-DC or NR-NR Dual Connectivity (NR-DC) mode, and the SRB3 is configured and the SCG is in the activated state; Or submitting, as a message embedded in Radio Resource Control (RRC) message, the MeasurementReport message via SRB1 when the UE is in one of the EN-DC mode or the (NG) EN-DC or the NR-DC mode, and the SRB3 is not configured or the SCG is in the deactivated state.

In an implementation, the new handling procedures are as follows:

If NR is configured as SCG in MR-DC scenario i.e., (NG)EN-DC, NR-DC, and measurement report is triggered for configuration associated to SCG.

If SRB3 is configured on UE and SCG is not deactivated, or SRB3 is configured as a split SRB.

the MeasurementReport message is sent over SRB3.
    Else,
  the MeasurementReport message is sent over ULInformationTransferMRDC on MCG i.e., over SRB1 of MCG.

The procedures for sending the measurement reporting is depicted in Table 5. The objective of this procedure is to transfer measurement results from the UE to the network. The UE shall initiate this procedure only after successful AS security activation. For a measurement_Id for which the measurement reporting procedure was triggered, the UE shall set the measurement results within the MeasurementReport message as follows in Table 5.

TABLE 5

5.5.x Measurement reporting

...

1> else if the UE is in (NG)EN-DC:
   2> if SRB3 is configured and the SCG is not deactivated:
      3> submit the MeasurementReport message via SRB3 to lower layers for transmission, upon which the procedure ends;
   2> else:
      3> submit the MeasurementReport message via E-UTRA embedded in E-UTRA RRC message ULInformationTransferMRDC as specified in TS 36.331 [10].
1> else if the UE is in NR-DC:
   2> if the measurement configuration that triggered this measurement report is associated with the SCG:
      3> if SRB3 is configured and the SCG is not deactivated:
         4> submit the MeasurementReport message via SRB3 to lower layers for transmission, upon which the procedure ends;
      3> else:
4> submit the MeasurementReport message via SRB1 embedded in NR RRC message ULInformationTransferMRDC as specified in 5.7.2a.3;

In an embodiment of the disclosure, UE assistance information is considered. If NR is configured as SCG in MR-DC scenario i.e., (NG)EN-DC, NR-DC, and UE assistance information message transmission is triggered, new handling has to be added. The purpose of this procedure is for the UE to inform the network of:

its delay budget report carrying desired increment/decrement in the connected mode DRX cycle length; or
its overheating assistance information; or
its IDC assistance information; or
its preference on DRX parameters for power saving; or
its preference on the maximum aggregated bandwidth for power saving; or
its preference on the maximum number of secondary component carriers for power saving; or
its preference on the maximum number of MIMO layers for power saving; or
its preference on the minimum scheduling offset for cross-slot scheduling for power saving; or submitting the UEAssistanceInformation message to lower layers of the plurality of network nodes via the SRB3 when the UE is in one of EUTRA-NR Dual Connectivity (EN-DC) mode or (NG)EN-DC or NR-NR Dual Connectivity (NR-DC) mode, and the SRB3 is configured and the SCG is in the activated state; or submitting, as a message embedded in E-UTRA Radio Resource Control (RRC) message, the UEAssistanceInformationmessage via one of E-UTRA MCG or SRB1 when the UE is in one of the EN-DC mode or (NG)EN-DC or the NR-DC mode, and the SRB3 is not configured or the SCG is in the deactivated state.

Accordingly, Table 6 provides the new procedure for transferring the UEAssistanceInformation message from the UE to the one or more network nodes.

TABLE 6

1> else if the UE is in (NG)EN-DC:
   2> if SRB3 is configured and SCG is not deactivated:
      3>   submit the UEAssistanceInformation message via SRB3 to lower layers for transmission;
   2> else:
      3>   submit the UEAssistanceInformation message via the E-UTRA MCG embedded in E-UTRA RRC message ULInformationTransferMRDC as specified in TS 36.331 [10].
      1>   else if the UE is in NR-DC:
   2> if the UE assistance configuration that triggered this UE assistance information is associated with the SCG:
      3>   if SRB3 is configured and SCG is not deactivated:
      4> submit the UEAssistanceInformation message via SRB3 to lower layers for transmission;
      3>   else:
      4> submit the UEAssistanceInformation message via the NR MCG embedded in NR RRC message ULInformationTransferMRDC as specified in 5.7.2a.3;
   2> else:
      -  3>  submit the UEAssistanceInformation message via SRB1 to lower layers for transmission;

its preference on the RRC state; or
configured grant assistance information for NR sidelink communication; or
its preference in being provisioned with reference time information.

According to a further implementation, the method 500 further includes, performing a seventh set of the UE actions for transfer of the UEAssistanceInformation message from the UE to the plurality of network nodes. The seventh set of the UE actions for the transfer of the UEAssistanceInformationmessage includes one of:

In an embodiment of the disclosure, IAB Other Information procedure is considered. The IAB Other Information procedure is used by IAB-MT to request the IAB-donor-CU to allocate an IP address or inform the IAB-donor-CU of the IP address for the collocated IAB-DU. If NR is configured as SCG in MR-DC scenario i.e., (NG)EN-DC, and IABOtherInformation message transmission is triggered, new handling has to be added.

According to a further implementation, the method 500 further includes, performing another set of the UE actions for transfer of Integrated Access and Backhaul (IAB) other information message from the UE to the plurality of network nodes. The another set of the UE actions for the transfer of the IAB other information message includes one of:

submitting the IABOtherInformation message to lower layers of the plurality of network nodes via the SRB3 when the UE is in one of EUTRA-NR Dual Connectivity (EN-DC) mode or (NG)EN-DC or NR-NR Dual Connectivity (NR-DC) mode, and the SRB3 is configured and the SCG is in the activated state; or submitting, as a message embedded in E-UTRA Radio Resource Control (RRC) message, the IABOtherInformation message via one of E-UTRA MCG or SRB1 when the UE is in one of the EN-DC mode or (NG) EN-DC or the NR-DC mode, and the SRB3 is not configured or the SCG is in the deactivated state.

Alternately, the set of the UE actions for transfer of Integrated Access and Backhaul (IAB) may be referred as an eighth set of UE action. According to an embodiment of the disclosure, the set of the UE actions for transfer of Integrated Access and Backhaul (IAB) may correspond to the operation 407 of FIG. 4.

Accordingly, Table 7 provides the new procedure for transferring UE assistance information message from the UE to the one or more network nodes.

TABLE 7

1> if the IAB-MT is in (NG)EN-DC:
   2>   if SRB3 is configured and SCG is not deactivated:
   3>   submit the IABOtherInformation message via SRB3 to lower layers for transmission;
   2>   else:
   3>   submit the IABOtherInformation message via the E-UTRA MCG embedded in E-UTRA RRC message ULInformationTransferMRDC as specified in TS 36.331 [10].
      1> else:
      2> submit the IABOtherInformation message to lower layers for transmission.

In an embodiment of the disclosure, FailureInformation procedure is considered. A UE initiates the procedure when there is a need to inform the network about a failure detected by the UE. In particular, the UE initiates the procedure when the following condition is met:

upon detecting failure for an RLC bearer.
   upon detecting DAPS handover failure.
   Upon initiating the procedure, the UE 107 may perform:
   initiating transmission of the FailureInformation message.

According to a further implementation, the method 500 further includes, performing another set of the UE actions, for the transfer of a FailureInformation message by the UE to the plurality of network nodes. The another set of the UE actions for the transfer of failure detection information by the UE includes at least one of:

submitting the FailureInformation message, related to one of MCG RLC bearer or DAPS failure, to lower layers of the plurality of network nodes via the SRB1 when the failure detection corresponds to one of the MCG RLC bearer or the DAPS failure.

submitting the FailureInformation message to lower layers of the plurality of network nodes via the SRB3 when SRB3 is configured and SCG is not deactivated and the failure detection corresponds to SCG RLC bearer failure;

submitting the FailureInformation message via E-UTRA SRB1 embedded in an E-UTRA RRC message ULInformationTransferMRDC if the UE is in (NG)EN-DC, SRB3 is not configured or SCG is deactivated and the failure detection corresponds to SCG RLC bearer failure.

submitting the FailureInformation via SRB1 embedded in NR RRC message ULInformationTransferMRDC if the UE is in NR-DC, SRB3 is not configured and/or SCG is deactivated, and the failure detection corresponds to SCG RLC bearer failure.

Alternately, the set of the UE actions for the transfer of a FailureInformation message may be referred as the ninth set of UE action. According to an embodiment of the disclosure, the set of the UE actions for the transfer of a FailureInformation message may correspond to the operation 407 of FIG. 4.

Accordingly, Table 8 provides the new procedure for transferring for transfer of the FailureInformation message from the UE to the one or more network nodes.

TABLE 8

1>   if used to inform the network about a failure for an MCG RLC bearer or DAPS failure information:
   2>   submit the FailureInformation message to lower layers for transmission via SRB1;
   1>else if used to inform the network about a failure for an SCG RLC bearer:
   2>if SRB3 is configured and SCG is not deactivated;
      3> submit the FailureInformation message to lower layers for transmission via SRB3;
   2> else;
   3>if the UE is in (NG)EN-DC:
   4> submit the FailureInformation message via E-UTRA SRB1 embedded in E-UTRA RRC message ULInformationTransferMRDC as specified in TS 36.331 [10].
      3> else if the UE is in NR-DC:
         4>   submit the FailureInformation message via SRB1 embedded in NR RRC message ULInformationTransferMRDC as specified in clause 5.7.2a.3.

According to an embodiment of the disclosure, to handle a scenario where the SCG is deactivated and the PSCell is very poor, when the NW sends the SCG activation or reactivation request, the UE will trigger RACH and RACH failure will be declared after T304 timer expiry, hereby triggering a SCG failure.

According to an embodiment of the disclosure, the UE 107 or one or more network nodes determines a signal strength of a SCG link signal between the UE and at least one of the plurality of network nodes. The UE 107 maintains the SCG in the deactivated state when the determined signal strength is less than a specific threshold. The specific threshold can be specified or configured or an implementation choice. In another embodiment of the disclosure, after reception of the activation or reactivation request, if the UE is not able to activate the PSCell, UE encounters SCG failure after T304 timer expiry, the UE 107 transmits a FailureInformation message to the at least one of plurality of network nodes.

In an implementation as procedure 1: If the signal condition for the SCG link as received by UE is poor. For example, if the signal condition is below a specified and/or configured threshold the UE may choose not to activate the SCG and to continue to be in the deactivated state.

According to the procedure 2, if the UE is not able to activate the PSCell, UE encounters SCG failure after T304 timer expiry, the UE may send FailureInformation message, informing the same. The UE may use one of the existing failure causes in SCG failure information. But this will be difficult for MN to differentiate between a normal SCG failure and the SCG failure during reactivation. Hence, a new failure case needs to be included in SCG failure information for the reactivation failure of SCG. Upon detecting failure for an SCG activation, the UE initiates the transmission of FailureInformation message. Set the failure-Type as SCG-activation failure.

Further, Table 9 provides the new procedure, upon detecting of failure for an SCG activation or reactivation, for transfer of the FailureInformation message from the UE to the one or more network nodes. failureType is set as SCG-activation failure. As an example, the one or more network nodes may be the master node (MN).

TABLE 9

FailureInformation-v17xx-IEs ::
= SEQUENCE { failureInfoSCGActFail-r17 OPTIONAL,
nonCriticalExtension SEQUENCE { } OPTIONAL }
FailureInfoSCGActFail-r17::= SEQUENCE { failureType-r17
ENUMERATED {scg-actfail, spare3, spare2, spare1}

FIG. 8 illustrates a flow diagram for enabling UE actions upon SCG activation or re-activation according to an embodiment of the disclosure.

Referring to FIG. 8, it will be explained with respect to FIGS. 1 to 7 and a method 800 may be performed at the UE 107. In an embodiment upon re-activation or activation of the SCG, The UE 107 may perform following:

At operation 801-A: The method 800, includes determining a reactivation or activation of a Secondary Cell Group (SCG) in which a UE is operating. The UE performs based on the determination reactivation of the Secondary Cell Group (SCG), at least one of a first UE action or a second UE action at operation 801-B.

Accordingly, at operation 801: The method 800, includes performing another set of the UE actions for Signaling Radio Bearers (SRBs) and DRBs. At operation 803, the method 800, the UE determines whether SRB3 is established and is suspended between the UE and at least one network node of a plurality of network nodes. At operation 805, the UE 107 performs resuming the SRB3 based on the determination that the SRB3 is established and is suspended between the UE and at least one network node. At operation 807, the UE 107 performs resuming transmission and reception over the SCG for split SRBs. The method 800 at operation 809, the UE 107 further performs resuming the transmission and the reception over the SCG for Data Radio Bearers (DRBs). In an embodiment of the disclosure, UE resumes transmission of Sounding Reference Signal (SRS) on the PSCell at operation 810.

The operations 803-810 includes another set of UE actions. The another set of UE action for SRB's on reactivation may alternately referred as a first set of UE action.

Further at operation 811, the UE performs a second set of the UE actions for Multicast and Broadcast Service Radio Bearers (MRBs). The second set of the UE actions includes methods at operations 811-815. Accordingly, operation 813, the method 800 includes resuming the multicast services reception over the SCG when the UE was receiving before deactivation the multicast services over the SCG via the MRBs. Further, at operation 815, the UE continues the reception of broadcast services over the SCG via the MRBs.

In an implementation, the UE 107, upon deactivation of SCG, the UE 107 may follow actions as shown in the FIG. 4 above. Further the operations 803-807 and 813-815 may corresponds to operation 407 of the FIG. 4.

Upon reactivation of SCG,
For SRBs:
    Resuming SRB3, if established and suspended.
    Resuming transmission and reception over SCG for split SRBs.
For DRBs:
General Actions:
    Resuming transmission and reception over SCG for DRBs.
    Resumes transmission of Sounding Reference Signal (SRS) on the PSCell.
For MRBs:
    Resuming reception over SCG for MRBs when UE was receiving multicast services before deactivation.
    Continuing reception over SCG for MRBs when UE is receiving broadcast services.
    According to another embodiment of the disclosure, as an ALT1 at least one of the following actions are performed that includes:
    Resuming the evaluation of configuration(s) associated with SCG received in measConfig.
    Resuming otherConfig associated with the SCG, if configured.
    Starting or restart timers T346a, T346b, T346c, T346d and T346e associated with the SCG, if not running.
    Resuming bap-Config associated with the SCG, if configured.
    Resuming iab-IP-AddressConfigurationList associated with the SCG, if configured.
    According to yet further embodiment of the disclosure, as an ALT2 at least one of the following actions are performed that includes:
    Reconfiguring of configuration(s) associated with SCG received in measConfig.
    Reconfiguring of otherConfig associated with the SCG, if configured.
    Starting or restarting timers T346a, T346b, T346c, T346d and T346e associated with the SCG, if not running.
    Reconfiguring bap-Config associated with the SCG, if configured;
    Reconfiguring iab-IP-AddressConfigurationList associated with the SCG, if configured.
    According to an embodiment of the disclosure, the method 800 further includes, at least one of starting, upon SCG activation or reactivation, for Radio Link Monitoring (RLM) entities, a plurality of timers configured on the SCG based on a determination of a running state of the plurality of timers. The UE continues, for at least one of beam failure detection (BFD) and radio link monitoring (RLM) in at least one cell in the SCG utilizing previous configurations for RLM or BFD before the SCG activation. The UE performs, for at least one of beam failure detection (BFD) and radio link monitoring (RLM) in at least one cell in the SCG by utilizing a new configuration for the at least one of BFD or RLM, wherein the new configuration is received at SCG activation via at least one of a RRC reconfiguration and an RRCResume message that carries CellGroupconfig information.

According to the embodiment of the disclosure, for RLM entities: Starting a timers T310, T312 on SCG if not running.

Accordingly, if the Start timer T304 on SCG is on, if not running.

In an embodiment of the disclosure, upon SCG activation, UE continues monitoring for the radio link monitoring in at least one cell in the SCG utilizing existing configurations for RLM (e.g., as configured at the time of SCG deactivation and/or as applicable before SCG activation). In another embodiment of the disclosure, upon SCG activation, UE continues monitoring for the radio link monitoring in at least one cell in the SCG utilizing new configurations for RLM. The new configurations for RLM is received along with SCG activation e.g., through RRC reconfiguration, RRCResume message carrying CellGroupConfig.

In an embodiment of the disclosure, upon SCG activation, UE continues monitoring for the beam failure detection in at least one cell in the SCG utilizing existing configurations for BFD (e.g., as configured at the time of SCG deactivation and/or as applicable before SCG activation). In another embodiment of the disclosure, upon SCG activation, UE performs monitoring for the beam failure detection in at least one cell in the SCG utilizing new configurations for BFD. The new configurations for BFD is received along with SCG activation e.g., through RRC reconfiguration, RRCResume message carrying CellGroupconfig.

According to an embodiment of the disclosure, the method 800 further includes, the UE performing, upon SCG deactivation, an eighth set of UE action for at least one of Radio Resource Management (RRM) measurement and Channel-State Information (CSI) measurement. The eighth set of UE action comprising one of (a) continuing to perform the at least one of RRM measurement and CSI measurement, with an existing RRC and/or CSI configurations, in the at least one of the cells in SCG. Else (b) continuing to perform the at least one of RRM measurement and CSI measurement, with a new received RRC and/or CSI configurations at SCG activation, in the at least one of the cells in SCG.

In an embodiment of the disclosure, at SCG activation or reactivation, UE performs RRC measurement and CSI measurement as at least one of the following:

continuing to perform the at least one of RRM measurement and CSI measurement, with the existing RRC and/or CSI configurations, (e.g., as configured at the time of SCG deactivation and/or as applicable before SCG activation), on at least one of the cells in SCG.

continuing to perform the at least one of RRM measurement and CSI measurement, with the new received RRC and/or CSI configurations at SCG activation, on at least one of the cells in SCG. The new configurations are received in RRC reconfiguration message at the SCG activation.

Further embodiments will be explained with respect to the PDCP entity and related UE actions upon reactivation of the SCG according to further embodiment of the disclosure, the method 800 further includes performing UE at least one of:

resuming Packet Data Convergence Protocol (PDCP) and set the state variables of PDCP entity to initial values, based on a determination of the PDCP suspension was due to deactivation of the SCG. or forwarding data packet associated with the PDCP to the SCG when required, based on a determination that the PDCP was not suspended due to the deactivation of the SCG.

In an implementation as an ALT1 includes: If PDCP was suspended due to SCG deactivation, resume the PDCP, set the state variables of the PDCP entity to initial values.

In an implementation as an ALT2: If PDCP entity was not suspended due to SCG deactivation, forward the packets to SCG as and when required.

Further embodiments will be explained with respect to the RLC entity and related UE actions upon reactivation of the SCG.

According to further embodiment of the disclosure, the method 800 further includes performing UE 107 at least one of:

setting, to resume RLC entities for the DRBs configured on the SCG, each of state variables associated with the RLC entity to initial values, wherein the state variables associated with the RLC entity are variables that were reset during deactivation of the SCG. Or resuming, to resume RLC entities for the DRBs configured on the SCG, a usage of state variables based on storage of the state variables during the deactivation of the SCG.

Accordingly, the UE resumes RLC entities for DRBs configured on SCG. In an example as an ALT1 includes: If all state variables were reset during SCG deactivation, set the state variables to initial values. In an example as an ALT2 includes: If the state variables at the time of SCG deactivation were stored, resume the usage upon reactivation.

According to the further embodiment of the disclosure, if there is a PSCell change when SCG is deactivated, and if it continues to be in deactivated state, the method 800 further includes reconfiguring the PDCP/RLC/MAC entities for the target cell group in accordance with the received corresponding config. Then, performing the legacy procedures during handover and set all parameters accordingly and continuing to be in SCG deactivated state. Further the method includes keeping the status/state of PDCP, RLC, MAC entities same as it was in the source cell and keeping the status/state of SRBs, DRBs same as it was in the source cell.

Further embodiments will be explained with respect to the MAC entity and related UE actions upon reactivation of the SCG.

According to further embodiment of the disclosure, the method 800 further includes performing UE 107 performing another set of the UE actions for Medium Access Control (MAC) entities when a time alignment (TA) timer continues to run when the SCG is deactivated. Alternately, the another set of the UE action for Medium Access Control (MAC) entities when the time alignment time alignment (TA) timer continues to run when the SCG is deactivated may be referred as third set of UE action. The another set of the UE actions includes:

restricting initiation of Random Access Channel (RACH) process during the reactivation of the SCG when the re-activation occurs in a same deactivated cell.

initiating, when a handover occurs to a new cell, the RACH process to a target cell and start/restart the TA timer upon reception of a timing advance command, wherein the RACH process is initiated based on a need of a Primary Secondary Cell (PSCell) or SCG to be in one of an activation state or a deactivation state.

restricting initiation of Random Access Channel (RACH) process when a need of a Primary Secondary Cell (PSCell) or SCG to be in one of an activation state or a deactivation state.

In an implementation an ALT1 for third set of UE action are as follows if timeAlignmentTimer continues to run when SCG is deactivated, if timeAlignmentTimer is running and if the activation happens in the same deactivated cell, then no need to initiate RACH procedure while activating SCG. Further, if there is a handover to new cell, and if the target PSCell/SCG needs to be in activated state then in an implementation as an ALT1 includes initiating a RACH procedure to the target cell and start/restart timeAlignmentTimer upon receiving Timing Advance Command In a further implementation, the third set of UE action includes restricting, when a handover occurs to a new cell, triggering of a random access channel (RACH) process to a target cell based on a need of a primary secondary cell (PSCell) to be in one of an activation state of the SCG or a deactivation state of the SCG. As an example, the implementation of the ALT2 includes block the triggering of the RACH procedure to the target cell. That is, RACH procedure is not performed on target cell.

According to the further embodiment of the disclosure, the method 800 further includes performing another set of the UE actions for MAC entities when a TA timer continues to run when the SCG is deactivated. The another set of the UE actions for MAC entities when a TA timer continues to run when the SCG is deactivated may be alternately referred as a fourth set of UE action. Further, the another set of UE action for MAC entities when a TA timer continues to run when the SCG is deactivated may corresponds to operation 407 of the FIG. 4.

The another set of the UE actions includes initiating a random access channel (RACH) process while activating the SCG when the activation occurs in a same deactivated cell and thereafter, initiating, when a handover occurs to a new cell, the RACH process to a target cell and start/restart the TA timer upon reception of a timing advance command, wherein the RACH process is initiated based on a need of a primary secondary cell (PSCell) to be in one of an activation state of the SCG or a deactivation state of the SCG.

Accordingly, if the target PScell/SCG needs to be in deactivated state. In an implementation, as an ALT1 includes initiating RACH procedure to the target cell and start/restart timeAlignmentTimer upon receiving Timing Advance Command.

In a further implementation, an ALT2 includes not to trigger RACH procedure to the target cell. Start/Restart timeAlignmentTimer. Further, if the activation happens in the same deactivated cell, then initiate RACH procedure while activating SCG.

According to the further embodiment of the disclosure, the method 800 further includes performing another set of the UE actions for MAC entities when a TA timer is stopped after deactivation of the SCG. The another set of the UE actions for MAC entities when a TA timer when a time alignment timer is stopped after deactivation of the SCG may be alternately referred as the sixth set of UE action. Further, the another set of UE action when a time alignment timer is stopped after deactivation of the SCG may corresponds to operation 407 of the FIG. 4.

The another set of the UE actions includes initiating RACH process during the re-activation of the SCG when the re-activation occurs in a same deactivated cell, then initiating, when a handover occurs to a new cell, the RACH process to a target cell to start the time alignment timer upon reception of timing advance command, wherein the RACH process is initiated based on a need of a primary secondary cell (PSCell) to be in one of an activation state of the SCG or a deactivation state of the SCG.

Thus, in an implementation, if there is a handover to new cell, if the target PSCell/SCG needs to be in activated state, then initiate RACH procedure to the target cell and start timeAlignmentTimer upon receiving Timing Advance Command. In an alternate implementation, if the target PSCell/SCG needs to be in deactivated state then initiate RACH procedure to the target cell and start timeAlignmentTimer upon receiving Timing Advance Command.

In a further implementation as an ALT2: If timeAlignmentTimer is stopped when SCG is deactivated, if the activation happens in the same deactivated cell, initiate RACH procedure while activating SCG, if there is a handover to new cell, If the target PSCell/SCG needs to be in activated state, then in an implementation as an approach: Initiating RACH procedure to the target cell and start timeAlignmentTimer upon receiving Timing Advance Command. In a further implementation, if the target PSCell/SCG needs to be in deactivated state. As an approach: Initiating RACH procedure to the target cell and start timeAlignment-Timer upon receiving Timing Advance Command. In a further embodiment of the disclosure, if timeAlignment-Timer is running when SCG is deactivated and timeAlignmentTimer expires before getting activation/reactivation, UE does not initiate RACH procedure.

In an embodiment of the disclosure, upon (re)activation of SCG, UE resumes reporting BSR and/or PHR over SCG leg. According to the further embodiment of the disclosure, the method 800 includes, another set of the UE actions upon SCG re-activation. The another set of UE action for upon SCG re-activation may be alternately referred as seventh set of UE action and corresponds to block 407 of the FIG. 4.

The another set of UE action, upon (re)activation of SCG, includes resuming all DPS related parameters and procedures should be resumed. Further, upon reception of the RRCResume message by the UE, UE resumes the SRB2, SRB3 if configured and is not deactivated, and all DRBs except for DRBs, if any, pertaining to SCG, if SCG is deactivated.

In an embodiment of the disclosure, upon (re)activation of SCG, UE triggers reporting of BSR and/or PHR over SCG leg.

In an embodiment of the disclosure, upon (re)activation of SCG, UE continues running TA timer, if already running, or starts/restarts TA timer.

In an embodiment of the disclosure, upon deactivation and/or (re)activation of SCG, UE triggers reporting of UE assistance information, for conveying at least one of the information to the network as described in earlier section, but not limited by that.

In an embodiment of the disclosure, when UE needs to initiate SCG deactivation, it requests to the network for SCG deactivation through UE assistance information. UE assistance information message may include a new field to convey "SCG deactivation request" and/or same is conveyed by using at least one of the existing fields of the UE assistance information message (e.g., overheating, power saving etc.). Network configures UE for the UE assistance information for the purpose of indicating SCG deactivation request and provides relevant configurations e.g., prohibit timer Txxx and/or other timer Tyyy/parameters configurations etc. Upon sending UE assistance information message for SCG deactivation, UE starts/restarts timer Txxx. Upon receiving confirmation or deactivation command from the network, UE undertakes SCG deactivation. Prohibit timer Txxx is stopped. If no response is received, UE can trigger again sending of UE assistance information guided by a timer e.g., prohibit timer Txxx expiry so as to avoid unnecessary frequent requests. If rejection is received from network, UE stops the prohibit timer and does not request again, until new cause for SCG deactivation is triggered or a new timer Tyyy is utilized to guide the request of the SCG deactivation again to the network.

In an embodiment of the disclosure, SCG deactivation and/or SCG activation or reactivation is triggered based on the dynamic capability changes for the UE which is engaged in multi-SIM (MUSIM) operations. The UE assistance information message carries the updated capability (e.g., number of Rx and/or Tx links currently supported, PHY or RF capability, base-band computational capability, radio bands or band combinations supported, purpose or cause of SCG deactivation or action, such as MUSIM operation etc.) and is reported to the network.

According to the further embodiment of the disclosure, the method 800 further includes, determining SCG reactivation failure, after receiving an SCG activation or reactivation request from the at least one of plurality of network nodes, based on expiry of a timer (T304), Thereafter, transmitting a FailureInformation message to the at least one of plurality of network nodes upon failure in activation or re-activation of the SCG. The failureType in the FailureInformation message is set as SCG-activation failure.

According to an embodiment upon receiving a SCG activation or reactivation request from the at least one of plurality of network nodes when the SCG is deactivated and a PSCell is very poor. Further, if the UE 107 is not able to activate the PSCell, then it may result in SCG failure after T304 timer expiry thereby triggering the SCG failure. Further, the UE may use one of the existing failure causes in SCG failure information. However, this will be difficult for MN to differentiate between a normal SCG failure and the SCG failure during SCG activation or reactivation. Hence, a new failure case needs to be included in SCG failure information for the reactivation failure of SCG.

According to the above procedures, the UE may send FailureInformation message. Upon detecting failure for an SCG activation, the UE initiates the transmission of FailureInformation message. Set the failureType as SCG-activation failure.

Some example embodiments disclosed herein may be implemented using processing circuitry. For example, some example embodiments disclosed herein may be implemented using at least one software program running on at least one hardware device and performing network management functions to control the elements. Further, the one or more UE action as explained in the above corresponds to block 407 of the FIG. 4 without deviating from the scope of the disclosure.

While specific language has been used to describe the disclosure, any limitations arising on account thereto, are not intended. As would be apparent to a person in the art, various working modifications may be made to the method in order to implement the inventive concept as taught herein.

The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. In addition, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a network, a radio resource control (RRC) reconfiguration message including configuration information indicating a deactivation of a secondary cell group (SCG) of the UE and a field for a beam failure detection (BFD) and a radio link monitoring (RLM) associated with the SCG of the UE;

performing a medium access control (MAC) reset based on the configuration information;

in case that the field is set to perform the BFD and the RLM, performing the BFD and the RLM on a primary SCG cell (PSCell) of the SCG of the UE when the SCG of the UE is deactivated; and in case that the field is set to not perform the BFD and the RLM, stopping a timer T310 and a timer T312 when the SCG of the UE is deactivated.

2. The method of claim 1, wherein a sounding reference signal (SRS) on the PSCell is not transmitted, when the SCG of the UE is deactivated.

3. The method of claim 1, further comprising:

identifying a radio link failure (RLF) to be detected for a master cell group (MCG) associated with the UE; and in case that the SCG of the UE is deactivated, initiating an RRC connection re-establishment procedure.

4. The method of claim 1, further comprising:

cancelling a triggered reporting procedure of at least one of a buffer status report (BSR) or a power headroom report (PHR), when the SCG of the UE is deactivated.

5. The method of claim 1, further comprising:

in case that the SCG of the UE is deactivated, transmitting, a measurement report message to the network.

6. The method of claim 1, further comprising:

in case that the SCG of the UE is deactivated, transmitting, a UE assistance information message to the network.

7. A user equipment (UE) in a wireless communication system, the UE comprising:

a transceiver; and at least one processor coupled with the transceiver and configured to:

receive, from a network, a radio resource control (RRC) reconfiguration message including configuration information indicating a deactivation of a secondary cell group (SCG) of the UE and a field for a beam failure detection (BFD) and a radio link monitoring (RLM) associated with the SCG of the UE, perform a medium access control (MAC) reset based on the configuration information, in case that the field is set to perform the BFD and the RLM, perform the BFD and the RLM on a primary SCG cell (PSCell) of the SCG of the UE when the SCG of the UE is deactivated, and in case that the field is set to not perform the BFD and the RLM, stop a timer T310 and a timer T312 when the SCG of the UE is deactivated.

8. The UE of claim 7, wherein a sounding reference signal (SRS) on the PSCell is not transmitted, when the SCG of the UE is deactivated.

9. The UE of claim 7 wherein the at least one processor is further configured to:

identify a radio link failure (RLF) to be detected for a master cell group (MCG) associated with the UE; and in case that the SCG of the UE is deactivated, initiate an RRC connection re-establishment procedure.

10. The UE of claim 7, wherein the at least one processor is further configured to:

cancel a triggered reporting procedure of at least one of a buffer status report (BSR) or a power headroom report (PHR), when the SCG of the UE is deactivated.

11. The UE of claim 7, wherein the at least one processor is further configured to:

in case that the SCG of the UE is deactivated, transmit, a measurement report message to the network.

12. The UE of claim 7, wherein the at least one processor is further configured to:

in case that the SCG of the UE is deactivated, transmit, a UE assistance information message to the network.

* * * * *